(12) United States Patent
Yohe et al.

(10) Patent No.: US 12,049,371 B2
(45) Date of Patent: Jul. 30, 2024

(54) METHOD FOR FORMING AN ARTICLE ARRAY

(71) Applicant: DYCO, INC., Bloomsburg, PA (US)

(72) Inventors: Peter D. Yohe, Bloomsburg, PA (US); Benjamin M. Kuznicki, Bloomsburg, PA (US); Justin L. Mowery, Nescopeck, PA (US)

(73) Assignee: DYCO, INC., Bloomsburg, PA (US)

( * ) Notice: Subject to any disclaimer, the term of this patent is extended or adjusted under 35 U.S.C. 154(b) by 285 days.

(21) Appl. No.: 17/223,476

(22) Filed: Apr. 6, 2021

(65) Prior Publication Data
US 2021/0221628 A1 Jul. 22, 2021

Related U.S. Application Data

(62) Division of application No. 15/798,722, filed on Oct. 31, 2017, now abandoned.

(51) Int. Cl.
| | |
|---|---|
| *B65G 57/04* | (2006.01) |
| *B65B 35/32* | (2006.01) |
| *B65B 35/50* | (2006.01) |
| *B65D 71/00* | (2006.01) |
| *B65G 47/08* | (2006.01) |
| *B65G 57/00* | (2006.01) |
| *B65G 57/03* | (2006.01) |
| *B65G 57/10* | (2006.01) |
| *B65G 57/22* | (2006.01) |
| *B65G 57/24* | (2006.01) |

(52) U.S. Cl.
CPC .............. *B65G 57/04* (2013.01); *B65B 35/32* (2013.01); *B65D 71/0096* (2013.01); *B65G 47/088* (2013.01); *B65G 57/005* (2013.01); *B65G 57/03* (2013.01); *B65G 57/10* (2013.01); *B65G 57/22* (2013.01); *B65G 57/24* (2013.01); *B65B 35/50* (2013.01); *B65D 2571/00123* (2013.01)

(58) Field of Classification Search
CPC .... B65G 57/04; B65G 47/088; B65G 57/005; B65G 57/10; B65G 57/03; B65G 57/22; B65G 57/24; B65B 35/50; B65B 35/32; B65D 71/0096; B65D 2571/00123
See application file for complete search history.

(56) References Cited

U.S. PATENT DOCUMENTS

| | | | | |
|---|---|---|---|---|
| 4,453,873 A | * | 6/1984 | Curti | B65G 59/02 271/10.16 |
| 4,772,170 A | * | 9/1988 | Oldfield | B65G 47/90 414/793 |
| 5,161,847 A | * | 11/1992 | Yakou | B25J 15/103 901/46 |
| 5,844,807 A | * | 12/1998 | Anderson | B65G 57/245 414/789.6 |
| 6,003,917 A | * | 12/1999 | Tygard | B66F 9/183 294/902 |
| 7,547,052 B2 | * | 6/2009 | Yohe | B65G 47/90 294/197 |
| 7,634,894 B2 | * | 12/2009 | Yohe | B65G 57/03 53/157 |
| 9,586,769 B2 | | 3/2017 | Yohe et al. | |

(Continued)

*Primary Examiner* — Joshua G Kotis
*Assistant Examiner* — Scott A Howell
(74) *Attorney, Agent, or Firm* — McNees Wallace & Nurick LLC

(57) ABSTRACT

A method for building an article array comprised of (n) rows of articles, as disclosed herein.

11 Claims, 21 Drawing Sheets

(56) References Cited

U.S. PATENT DOCUMENTS

| | | | |
|---|---|---|---|
| 10,144,596 B2 | 12/2018 | Yohe et al. | |
| 2008/0095601 A1* | 4/2008 | Yohe | B65G 57/24 |
| | | | 414/788 |
| 2009/0056276 A1* | 3/2009 | Yohe | B65B 9/02 |
| | | | 53/398 |
| 2012/0039699 A1* | 2/2012 | Ward | B65G 57/26 |
| | | | 414/590 |
| 2019/0127157 A1* | 5/2019 | Yohe | B65G 57/005 |

* cited by examiner

METHOD FOR FORMING AN ARTICLE ARRAY

FIELD OF THE INVENTION

The present invention is directed to a method for forming an article array for ultimately palletizing articles, and specifically to a method for forming an article array for ultimately palletizing articles while using the same head for differently sized articles.

BACKGROUND OF THE INVENTION

When large numbers of stackable articles must be transported in large quantities to another location, especially when the article is small, the article may be packaged in a container to protect the article during shipping of the container. Alternately, to reduce the amount of handling required, the articles may be arranged in a tight grouping, or array of articles. Each array of articles can form a layer of articles that can be stacked on a pallet having a footprint which can be accommodated by freight hauling compartments, e.g., for truck, rail, sea or air vessels.

Palletizing articles is becoming increasingly automated in manufacturing facilities, wherein articles are moved via a conveyor, which articles are manipulated by robots onto pallets using specialized end of arm tooling or article head usable only on one article having a particular size/shape. That is, additional article heads must be specially constructed for each different article to be manipulated, which can be expensive, and could disrupt operations until a compatible article head is made available. Moreover, this operating limitation could prevent the ability to accommodate "special one-time runs" for a small amount of uniquely sized articles, such as for reasons including cost and time delays in obtaining a specialized head.

What is needed is a method for palletizing articles that does not suffer from these drawbacks.

SUMMARY OF THE INVENTION

The present invention further relates to a method for building an article array comprised of (n) rows of articles, the steps including:

(a) positioning a head having a pair of opposed substantially planar gripping members such that the pair of gripping members at least partially laterally surrounds a first row of first articles at a first location, the first location having a horizontal first support surface for supporting the first row of first articles;

(b) the pair of gripping members applying a compressive force parallel to the first support surface to opposed laterally surrounded surfaces of the first row of first articles;

(c) transporting the first row of first articles from the first location to a second location, the second location having a horizontal second support surface for supporting the first row of first articles;

(d) moving the pair of gripping members away from one another sufficiently to remove the compressive force from the first row of first articles;

(e) positioning the head such that the pair of gripping members at least partially laterally surrounds a second row of first articles at the first location;

(f) the pair of gripping members applying a compressive force parallel to the first support surface to opposed laterally surrounded surfaces of the second row of first articles;

(g) transporting the second row of first articles from the first location to the second location in close proximity to the first row of first articles, the first row of first articles and the second row of first articles having one of at least a first arrangement, a second arrangement, and a third arrangement;

(h) moving the pair of gripping members away from one another sufficiently to remove the compressive force from the second row of first articles;

(i) moving one gripping member of the pair of gripping members in a direction perpendicular to and away from the second support surface in response to the first row of first articles and the second row of first articles having the first arrangement or the second arrangement, in response to the first row of first articles and the second row of first articles having the third arrangement, moving one gripping member of the pair of gripping members in a direction perpendicular to and away from the second support surface is optional;

(j) moving the head in a lateral direction parallel to the second support surface such that the other one gripping member of the pair of gripping members urging the second row of first articles to move in the lateral direction toward the first row of first articles in response to the first row of first articles and the second row of first articles having the first arrangement or the second arrangement, the first row of first articles and the second row of first articles forming a partial article array, in response to the first row and the second row of first articles having the third arrangement, moving the head in a lateral direction parallel to the second support surface such that the other one gripping member of the pair of gripping members urging the second row of first articles to move in the lateral direction toward the first row of first articles is optional;

(k) repeating steps (e)-(j) until a partial article array is formed including an (n−1) row of first articles;

(l) positioning the head such that the pair of gripping members at least partially laterally surrounds an (n) row of first articles at the first location;

(m) the pair of gripping members applying a compressive force parallel to the first support surface to opposed laterally surrounded surfaces of the (n) row of first articles;

(n) transporting the (n) row of first articles from the first location to the second location in close proximity to the partial article array including the (n−1) row of first articles;

(o) moving the pair of gripping members away from one another sufficiently to remove the compressive force from the (n) row of first articles;

(p) moving one gripping member of the pair of gripping members in a direction perpendicular to and away from the second support surface in response to the partial article array including the (n−1) row of first articles and the (n) row of first articles having the first arrangement or the second arrangement, in response to the partial article array including the (n−1) row of first articles and the (n) row of first articles having the third arrangement, moving one gripping member of the pair of gripping members in a direction perpendicular to and away from the second support surface is optional; and (q) moving the head in a lateral direction parallel to the second support surface such that the other one gripping member of the pair of gripping members urging the (n) row of first articles to move in the lateral direction toward the partial article array including the (n−1) row of first articles in response to the partial article array including the (n−1) row of first articles and the (n) row of first articles having the first arrangement or the second arrangement, the partial article array including the (n−1) row of first articles and the (n) row of first articles forming the article array.

In response to the partial article array including the (n−1) row of first articles and the (n) row of first articles having the third arrangement, moving the head in a lateral direction parallel to the second support surface such that the other one gripping member of the pair of gripping members urging the (n) row of first articles to move in the lateral direction toward the partial article array including the (n−1) row of first articles is optional, the partial article array including the (n−1) row of first articles and the (n) row of first articles forming the article array.

The present invention yet further relates to a method of building a pallet comprised of article arrays, each article array having a plurality of article rows comprised of first articles extending in one of an x-direction and a y-direction within a rectangular areal footprint in the x-direction and the y-direction, including:

(a) inputting parameters including a height dimension, a width dimension and a length dimension of a first article, a dimension of the rectangular areal footprint in the x-direction, a dimension of the rectangular areal footprint in the y-direction, a dimension of a width of article rows to be provided from an article row source, a type of arrangement to be used between adjacent article rows for building the first article arrays, the direction (x-direction or y-direction) and length dimension of the article rows;

(b) in response to the parameters being input, a controller controls a number of articles contained in a first row of first articles, and each subsequent row of first articles, at a first location having a horizontal first support surface for supporting each row of first articles;

(c) positioning a head having a pair of opposed substantially planar gripping members such that the pair of gripping members at least partially laterally surrounds the first row of first articles at the first location;

(d) the pair of gripping members applying a compressive force parallel to the first support surface to opposed laterally surrounded surfaces of the first row of first articles;

(e) transporting the first row of first articles from the first location to a second location, the second location having a horizontal second support surface for supporting the first row of first articles and each subsequent row of first articles, the first row of first articles positioned in the inputted direction;

(f) moving the pair of gripping members away from one another sufficiently to remove the compressive force from the first row of first articles;

(g) positioning the head such that the pair of gripping members at least partially laterally surrounds a second row of first articles at the first location;

(h) the pair of gripping members applying a compressive force parallel to the first support surface to opposed laterally surrounded surfaces of the second row of first articles;

(i) transporting the second row of first articles from the first location to the second location in close proximity to the first row of first articles, the first row of first articles and the second row of first articles having an inputted type of arrangement of one of at least a first arrangement, a second arrangement and a third arrangement;

(j) moving the pair of gripping members away from one another sufficiently to remove the compressive force from the second row of first articles;

(k) moving one gripping member of the pair of gripping members in a direction perpendicular to and away from the second support surface in response to the first row of first articles and the second row of first articles having the first arrangement or the second arrangement, in response to the first row of first articles and the second row of first articles having the third arrangement, moving one gripping member of the pair of gripping members in a direction perpendicular to and away from the second support surface is optional;

(l) moving the head in a lateral direction parallel to the second support surface such that the other one gripping member of the pair of gripping members urging the second row of first articles to move in the lateral direction toward the first row of first articles in response to the first row of first articles and the second row of first articles having the first arrangement or the second arrangement, the first row of first articles and the second row of first articles forming a first partial article array, in response to the first row and the second row of first articles having the third arrangement, moving the head in a lateral direction parallel to the second support surface such that the other one gripping member of the pair of gripping members urging the second row of first articles to move in the lateral direction toward the first row of first articles is optional;

(m) repeating steps (g)-(l) until a first partial article array is formed including an (n−1) row of first articles;

(n) positioning the head such that the pair of gripping members at least partially laterally surrounds an (n) row of first articles at the first location;

(o) the pair of gripping members applying a compressive force parallel to the first support surface to opposed laterally surrounded surfaces of the (n) row of first articles;

(p) transporting the (n) row of first articles from the first location to the second location in close proximity to the first partial article array including the (n−1) row of first articles;

(q) moving the pair of gripping members away from one another sufficiently to remove the compressive force from the (n) row of first articles;

(r) moving one gripping member of the pair of gripping members in a direction perpendicular to and away from the second support surface in response to the first partial article array including the (n−1) row of first articles and the (n) row of first articles having the first arrangement or the second arrangement, in response to the first partial article array including the (n−1) row of first articles and the (n) row of first articles having the third arrangement, moving one gripping member of the pair of gripping members in a direction perpendicular to and away from the second support surface is optional;

(s) moving the head in a lateral direction parallel to the second support surface such that the other one gripping member of the pair of gripping members urging the (n) row of first articles to move in the lateral direction toward the first partial article array including the (n−1) row of first articles in response to the first partial article array including the (n−1) row of first articles and the (n)

row of first articles having the first arrangement or the second arrangement, the first partial article array including the (n−1) row of first articles and the (n) row of first articles forming a first article array, in response to the first partial article array including the (n−1) row of first articles and the (n) row of first articles having the third arrangement, moving the head in a lateral direction parallel to the second support surface such that the other one gripping member of the pair of gripping members urging the (n) row of first articles to move in the lateral direction toward the first partial article array including the (n−1) row of first articles is optional, the first partial article array including the (n−1) row of first articles and the (n) row of first articles forming the first article array;

(t) moving the head to a third location to pick up one of a slip sheet and a tray;

(u) placing the one of the slip sheet and the tray over the first article array;

(v) positioning the head such that the pair of gripping members at least partially laterally surrounds an (n+1) row of first articles at the first location;

(w) the pair of gripping members applying a compressive force parallel to the first support surface to opposed laterally surrounded surfaces of the (n+1) row of first articles;

(x) transporting the (n+1) row of first articles from the first location to a fourth location, the fourth location being the one of the slip sheet and the tray having a horizontal third support surface for supporting the (n+1) row of first articles and each subsequent row of first articles;

(y) moving the pair of gripping members away from one another sufficiently to remove the compressive force from the (n+1) row of first articles;

(z) positioning the head such that the pair of gripping members at least partially laterally surrounds an (n+2) row of first articles at the first location;

(aa) the pair of gripping members applying a compressive force parallel to the first support surface to opposed laterally surrounded surfaces of the (n+2) row of first articles;

(ab) transporting the (n+2) row of first articles from the first location to the fourth location in close proximity to the (n+1) row of first articles, the (n+1) row of first articles and the (n+2) row of first articles having the inputted type of arrangement of one of at least the first arrangement, the second arrangement, and the third arrangement;

(ac) moving the pair of gripping members away from one another sufficiently to remove the compressive force from the (n+2) row of first articles;

(ad) moving one gripping member of the pair of gripping members in a direction perpendicular to and away from the third support surface in response to the (n+1) row of first articles and the (n+2) row of first articles having the first arrangement or the second arrangement, in response to the (n+1) row of first articles and the (n+2) row of first articles having the third arrangement, moving one gripping member of the pair of gripping members in a direction perpendicular to and away from the third support surface is optional;

(ae) moving the head in a lateral direction parallel to the third support surface such that the other one gripping member of the pair of gripping members urging the (n+2) row of first articles to move in the lateral direction toward the (n+1) row of first articles in response to the (n+1) row of first articles and the (n+2) row of first articles having the first arrangement or the second arrangement, the (n+1) row of first articles and the (n+2) row of first articles forming a second partial article array, in response to the (n+1) row and the (n+2) row of first articles having the third arrangement, moving the head in the lateral direction parallel to the third support surface such that the other one gripping member of the pair of gripping members urging the (n+2) row of first articles to move in the lateral direction toward the (n+1) row of first articles is optional;

(af) repeating steps (z)-(ae) until a second partial article array is formed including a (2n−1) row of first articles;

(ag) positioning the head such that the pair of gripping members at least partially laterally surrounds a (2n) row of first articles at the first location;

(ah) the pair of gripping members applying a compressive force parallel to the first support surface to opposed laterally surrounded surfaces of the (2n) row of first articles;

(ai) transporting the (2n) row of first articles from the first location to the fourth location in close proximity to the second partial article array including the (2n−1) row of first articles;

(aj) moving the pair of gripping members away from one another sufficiently to remove the compressive force from the (2n) row of first articles;

(ak) moving one gripping member of the pair of gripping members in a direction perpendicular to and away from the third support surface in response to the second partial article array including the (2n−1) row of first articles and the (2n) row of first articles having the first arrangement or the second arrangement, in response to the second partial article array including the (2n−1) row of first articles and the (2n) row of first articles having the third arrangement, moving one gripping member of the pair of gripping members in a direction perpendicular to and away from the third support surface is optional;

(al) moving the head in a lateral direction parallel to the third support surface such that the other one gripping member of the pair of gripping members urging the (2n) row of first articles to move in the lateral direction toward the second partial article array including the (2n−1) row of first articles in response to the second partial article array including the (2n−1) row of first articles and the (2n) row of first articles having the first arrangement or the second arrangement, the second partial article array including the (2n−1) row of first articles and the (2n) row of first articles forming a second article array, in response to the second partial article array including the (2n−1) row of first articles and the (2n) row of first articles having the third arrangement, moving the head in a lateral direction parallel to the third support surface such that the other one gripping member of the pair of gripping members urging the (2n) row of first articles to move in the lateral direction toward the second partial article array including the (2n−1) row of first articles is optional, the second partial article array including the (2n−1) row of first articles and the (2n) row of first articles forming the second article array.

(am) moving the head to a fourth location to pick up one of a top sheet and a tray; and (an) placing the one of the top sheet and the tray over the second article array.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
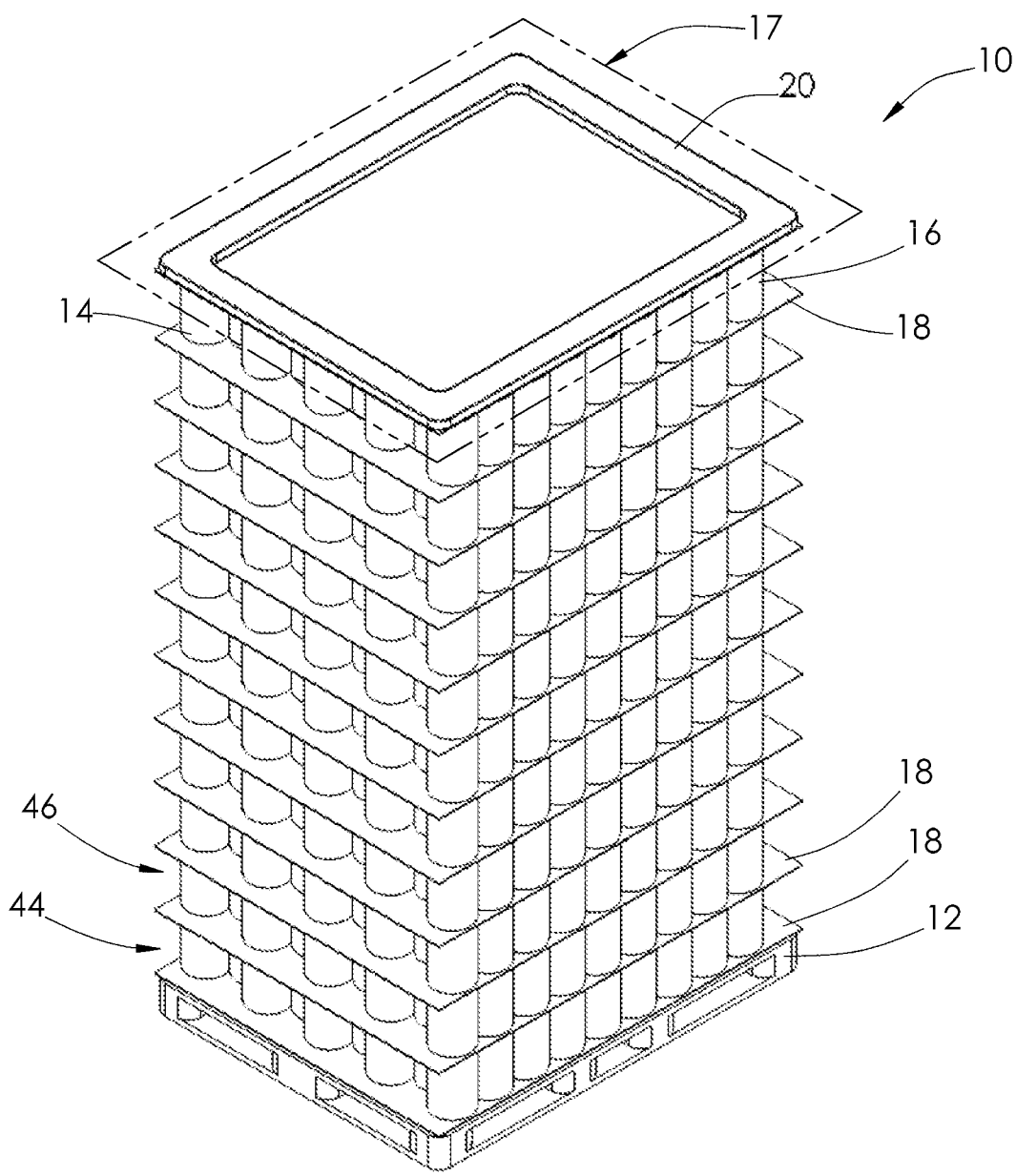
FIG. 1 is a perspective view of an exemplary full pallet of article arrays produced by the present invention.

The present invention includes a method for constructing palletized articles 10 from article arrays 16, which article arrays include a first article array 44 and a second article array 46 as shown in FIG. 1. For purposes of discussion, first article array 44 generally corresponds to the bottom or lowest article array of palletized articles, and second article array 46 generally corresponds to the next lowest article array constructed on top of and is supported by first article array 44. Palletized articles 10 are typically constructed by establishing a stacking area 72 (FIG. 5) having a horizontal support surface, then positioning a pallet 12 over the stacking area. Pallet 12 is overlain with a covering 18, such as a slip sheet, to provide a uniform substantially flat substantially horizontal surface on which to arrange and support articles 14 to form a first article layer or first article array 44. Alternately, instead of a slip sheet, a tray having a peripheral flange or other component can be used to achieve separation between adjacent article arrays 16.

The term "article array," "article layer" and the like may be used interchangeably.

The terms "building" "constructing" and "forming" and the like as it pertains to any of article layers, article arrays and palletized articles may be used interchangeably.

The terms "article array 16," "article array 44," "first article array 44," "article array 46," "second article array 46" and the like may generally refer to an article array, although (first) article array 44 and (second) article array 46 may also refer to the first two article arrays of a palletized article, such as depicted in FIG. 1.

Figure 2:
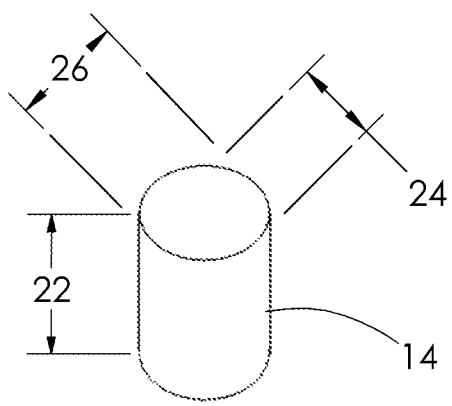
FIG. 2 is a perspective view of an exemplary article of the present invention.
Figure 3A:
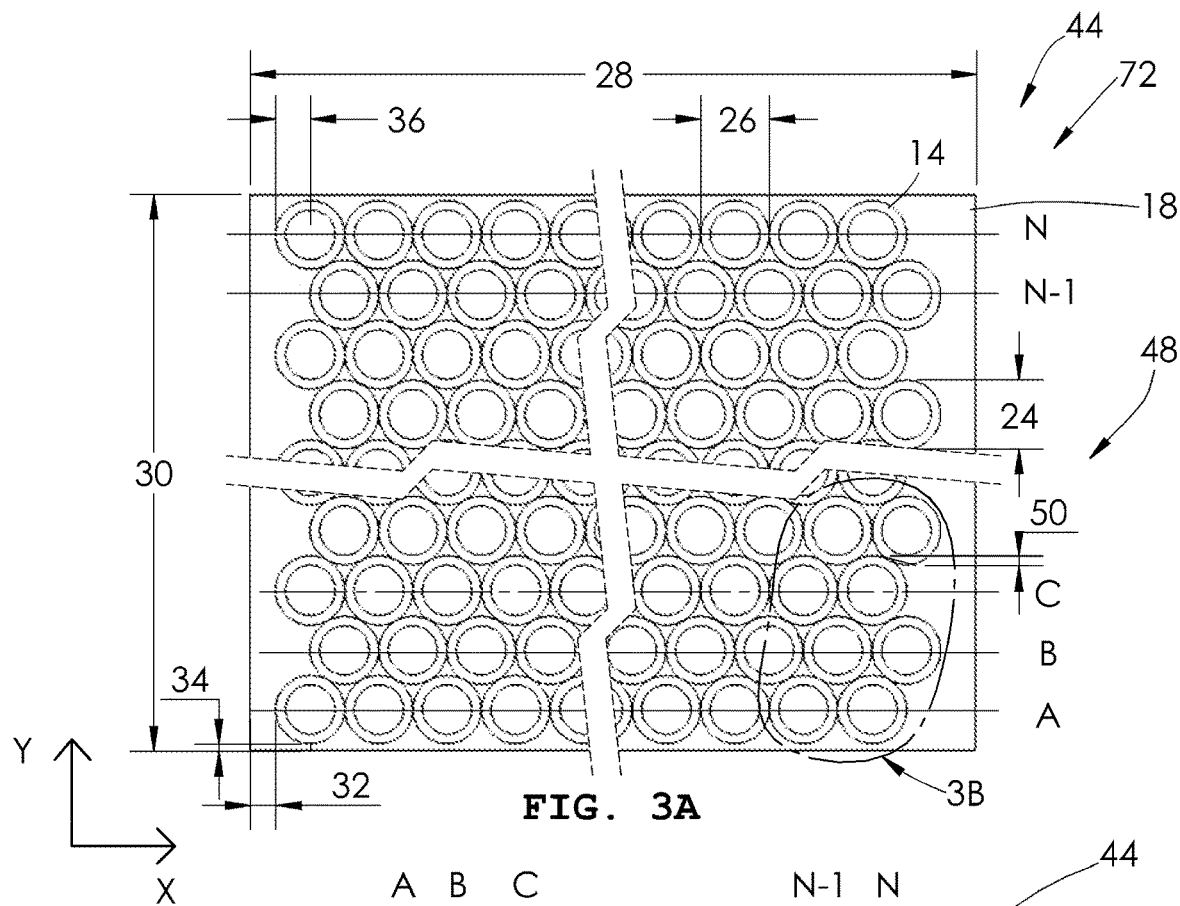
FIG. 3A is a plan view of an exemplary article array of the present invention.

As shown in FIG. 2, article 14 includes a vertical height 22, a lateral or horizontal width 24 and a lateral or horizontal length 26, each of which are mutually perpendicular to each other. For purposes of discussion, width 24 and length 26 of article 14 extend in an x-direction and a respective y-direction and have a corresponding lateral or horizontal areal footprint occupying a portion of the total horizontal rectangular areal footprint of an article array. In one embodiment, width 24 and length 26 are the same (e.g., circular or square profiles). For example, as shown in FIG. 3A, covering or slip sheet 18 has an x-direction dimension 28 and a y-dimension 30, with the resulting product of these dimensions 28, 30 defining a rectangular areal footprint in the x-direction and the y-direction. For purposes of discussion and consistency only, the origin of the x-axis and y-axis corresponds to the lower left hand side of covering or slip sheet 18. Article rows A through N extending in the x-direction collectively form first article array 44. As shown, cylindrically shaped articles 14 have respective dimensions of width 24 and length 26 that are the same. FIG. 3A further shows adjacent rows A through N which are alternately staggered, as a result of positioning alternating rows with an x-direction offset 36. The rows A through N not subjected to the x-direction offset 36 are positioned having an x-direction edge distance 32 from a corresponding edge of slip sheet 18. In one embodiment, the rows A through N which are subjected to the x-direction offset 36 are positioned having an x-direction edge distance from a corresponding edge of slip sheet 18 that is equal to x-direction edge distance 32. As shown in FIG. 3A, row N is positioned having a y-direction edge distance 34 from a corresponding edge of slip sheet 18. In one embodiment, each of rows A through N have the same y-direction edge distance 34. FIG. 3A shows an overlap 50 measured in the y-direction between adjacent rows A through N. As a result of overlaps 50, the first article array 44 of FIG. 3A defines a nested arrangement.

Figure 3C:
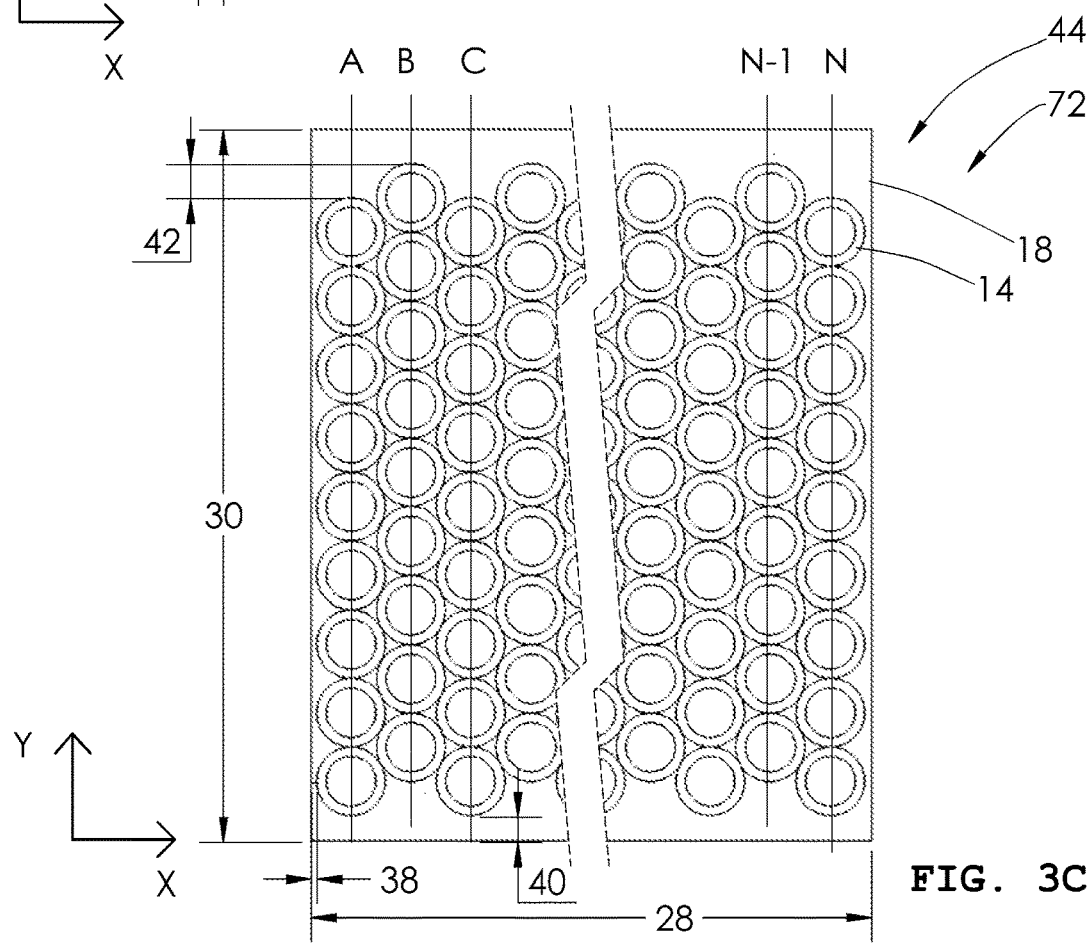
FIG. 3C is a plan view of an exemplary article array of the present invention.
Figure 3D:
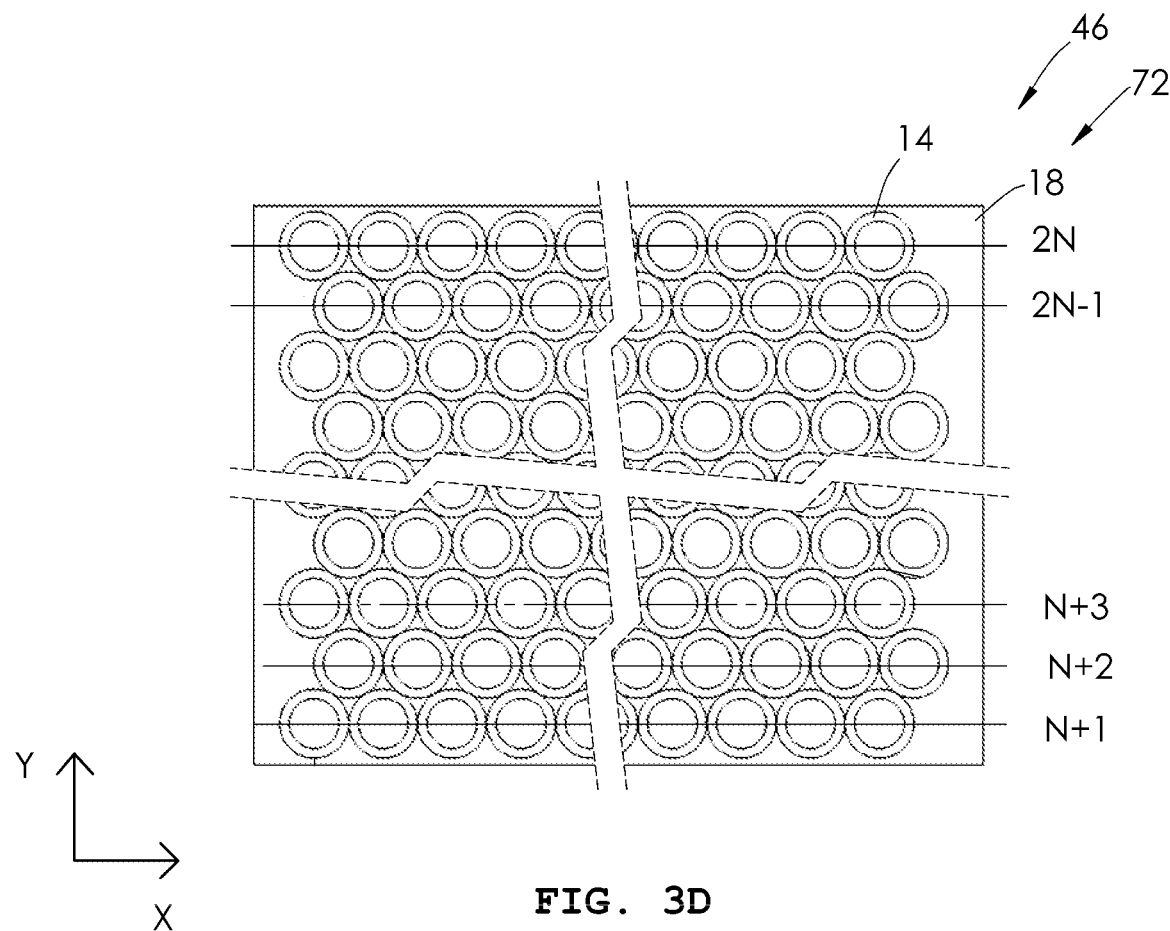
FIG. 3D is a plan view of an exemplary article array of the present invention.
Figure 3B:
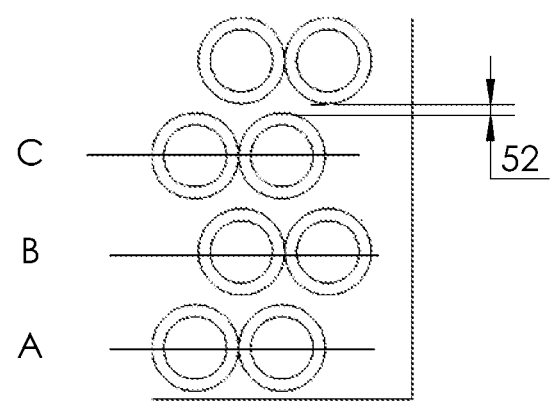
FIG. 3B is an enlarged, partial view of an alternate embodiment of an article array taken from region 3B of FIG. 3A.
Figure 6:
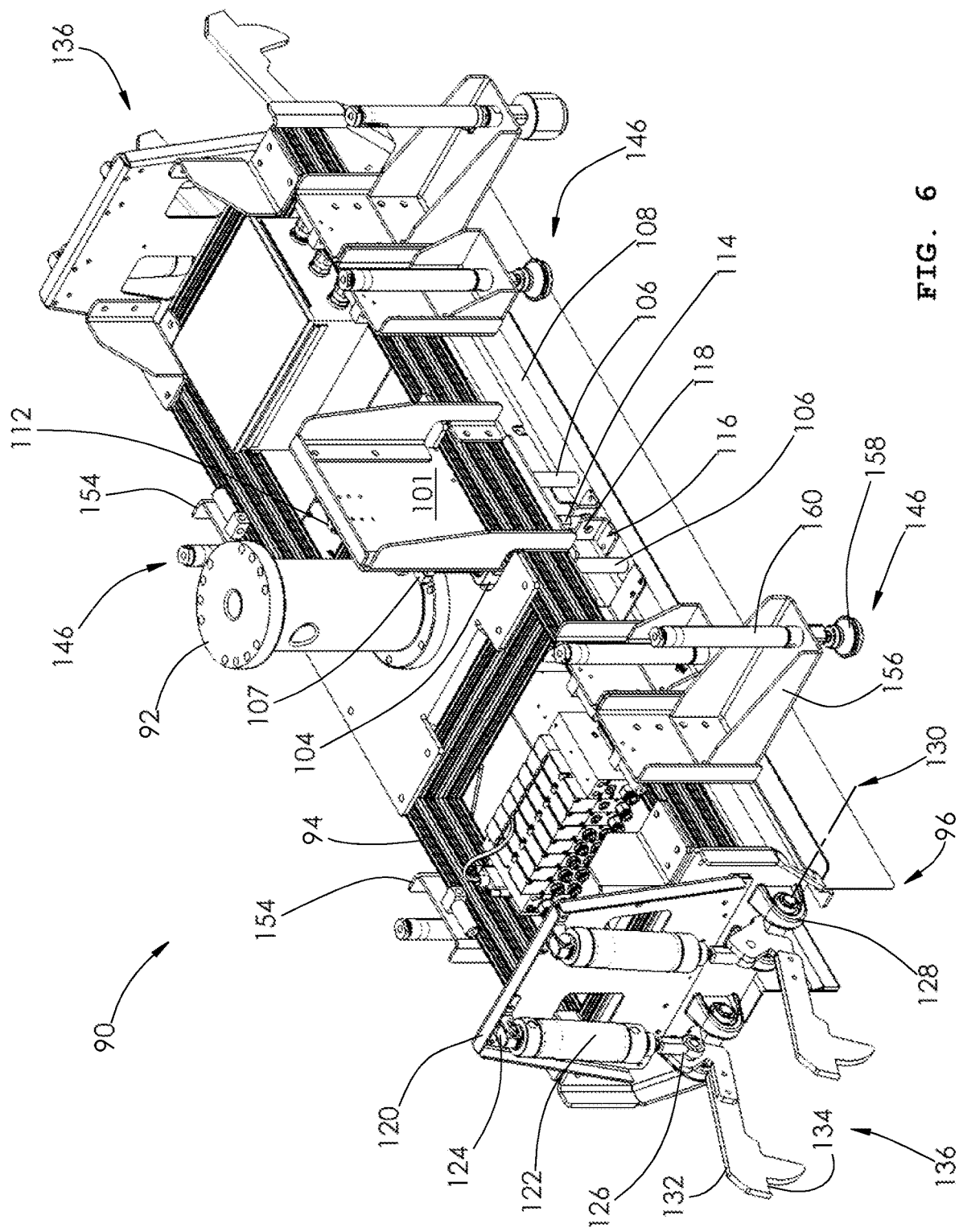
FIG. 6 is a perspective view of an exemplary article handling head of the present invention.

Optionally, as shown in FIG. 3B, which is an enlarged, partial view of an alternate embodiment of article array 44 taken from region 3B of FIG. 3A, instead of an overlap, a gap 52 is provided in the y-direction between adjacent rows A through N. As a result of gaps 52, the first article array 44 of FIG. 3B defines a non-nested arrangement. Depending upon the magnitude of gaps 52, the non-nested arrangement defines one of a non-nested closely spaced arrangement 54 or a non-nested non-closely spaced arrangement 58. For purposes herein, gap 52 for the non-nested closely spaced arrangement 54 is negligible, i.e., between zero and less than the width of gripping member 98 (FIG. 7) of article handling head 90 (FIG. 6), while gap 52 for the non-nested non-closely spaced arrangement 58 is equal to or greater than the width of gripping member 98 (FIG. 7) of article handling head 90 (FIG. 6). These differing arrangements 54, 58 require different manipulations of the pair of gripping members 96 (FIG. 6) during the formation of the article arrays, as will be discussed in additional detail below.

In contrast to FIG. 3A, FIG. 3C shows rows A through N extending in the y-direction, collectively forming first article array 44 having an x-direction edge distance 38, a y-direction edge distance 40, and a y-direction offset 42 from respective rows A through N, which are analogous to y-direction edge distance 34, x-direction edge distance 32, and x-direction offset 36 from respective rows A through N of FIG. 3A. For reasons to be discussed in additional detail below, the operator can choose which direction (x-direction or y-direction) the rows A through N are to extend.

Figure 4A:
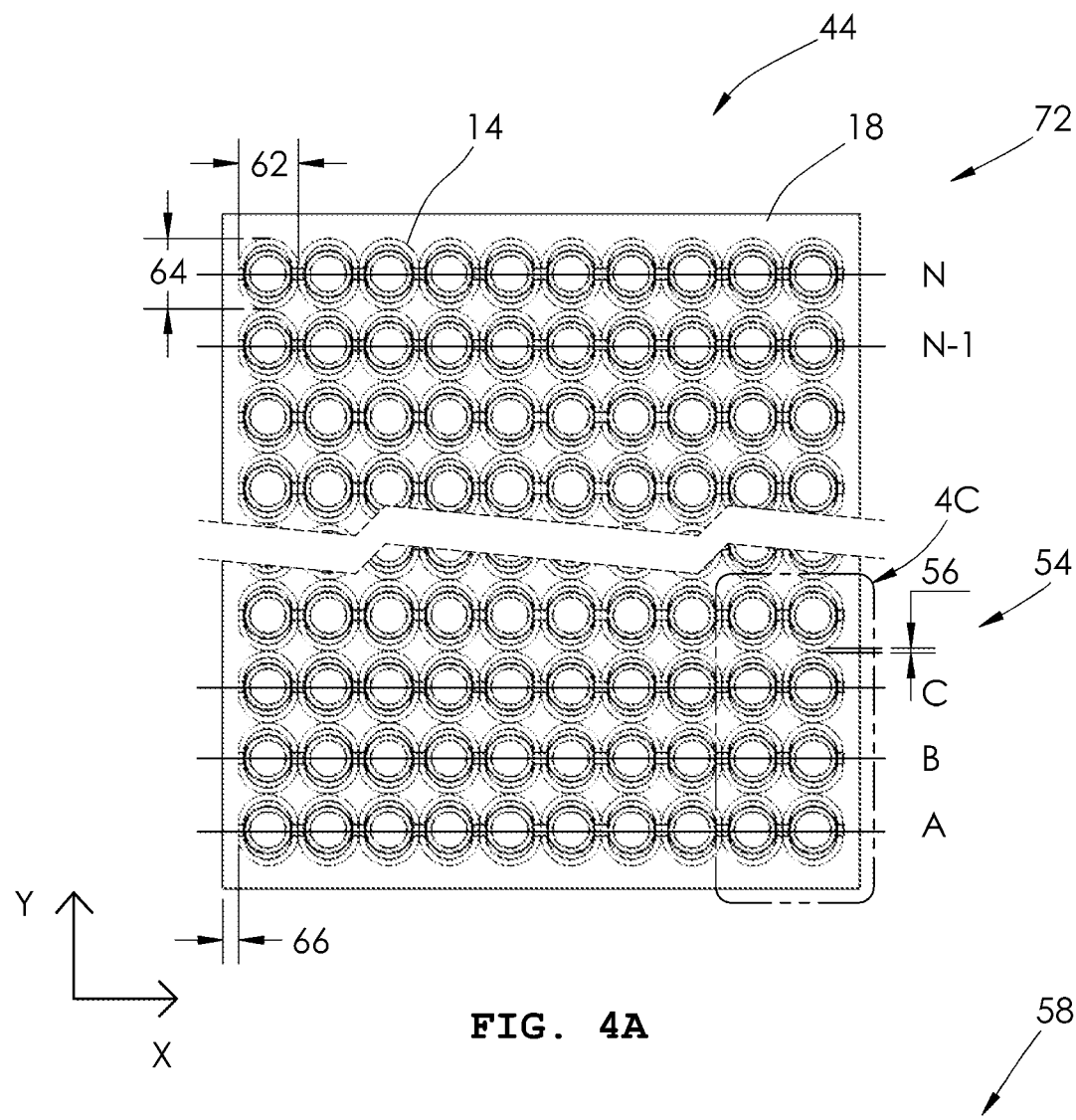
FIG. 4A is a plan view of an exemplary article array of the present invention.
Figure 4B:
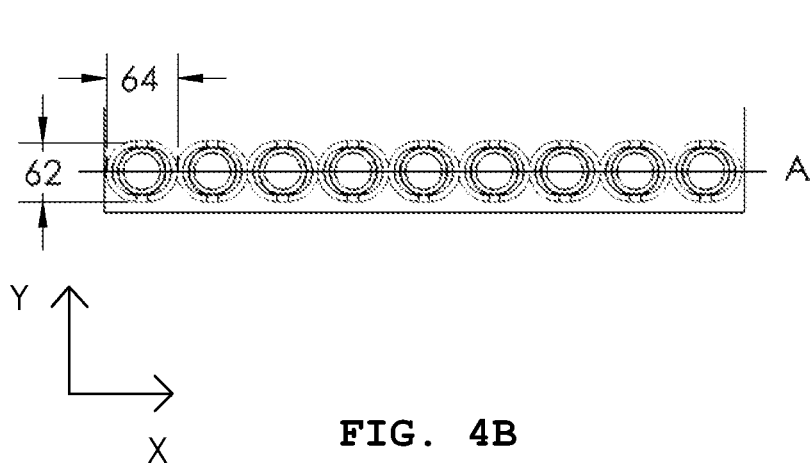
FIG. 4B is a partial view of an alternate embodiment of the article array of FIG. 4A.

FIG. 4A shows article rows A through N extending in the x-direction, each of the rows being mutually aligned with one another or having the same x-direction edge distance 66 from the corresponding edge of covering or slip sheet 18, versus the x-direction offset 36 between alternate rows A through N of FIG. 3A. Additionally, as shown in FIG. 4A, articles 14 are configured to have a width 64 that is different than its length 62. Alternately, as shown in FIG. 4B, articles 14 in their respective rows A through N can be arranged or rotated such that the articles have a width 62 that is different than its length 64. As shown in FIG. 4A, between each row of adjacent rows A through N is a gap 56 of negligible width.

Figure 4C:
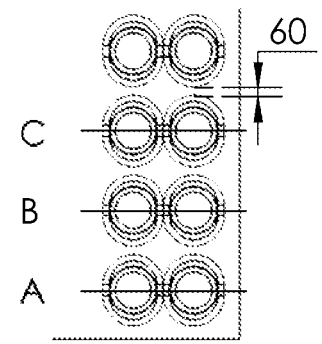
FIG. 4C is a partial view of an alternate embodiment of an article array taken from region 4C of FIG. 4A.
Figure 4D:
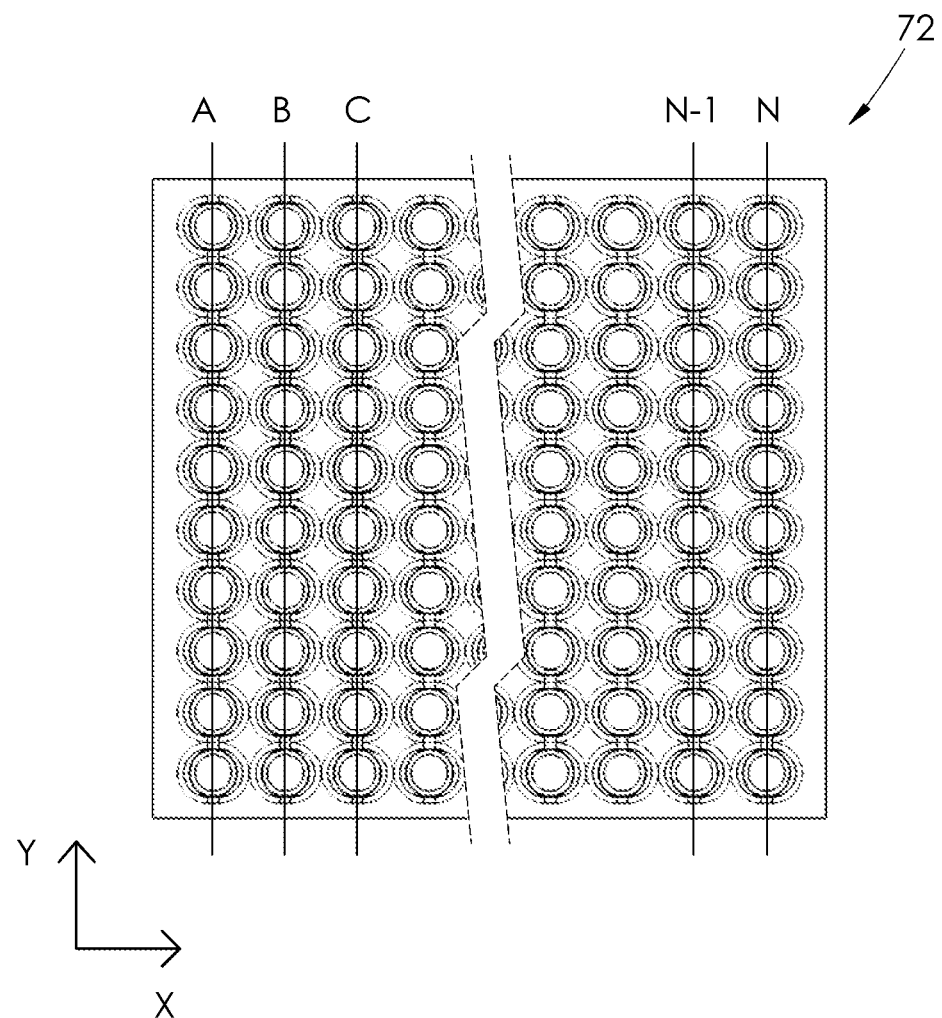
FIG. 4D is a plan view of an exemplary article array of the present invention.

Optionally, as shown in FIG. 4C, which is an enlarged, partial view of an alternate embodiment of article array 44 taken from region 4C of FIG. 4A, instead of a negligible gap 56 of FIG. 4A, FIG. 4C shows a gap 60 provided in the y-direction between adjacent rows A through N. As a result of gaps 60, the first article array 44 of FIG. 4A defines a non-nested arrangement. Depending upon the magnitude of gaps 56, 60 the non-nested arrangement defines one of a non-nested closely spaced arrangement 54 or a non-nested non-closely spaced arrangement 58. For purposes herein, gap 56 is between zero and less than the width of gripping member 98 (FIG. 7) of article handling head 90 (FIG. 6) and defines a non-nested closely spaced arrangement 54, while gap 60 is greater than the width of gripping member 98 (FIG. 7) of article handling head 90 (FIG. 6) and defines a non-nested non-closely spaced arrangement 58. These differing arrangements 54, 58 require different manipulations of the pair of gripping members 96 (FIG. 6) during the formation of the article arrays, as will be discussed in additional detail below.

Figure 5:
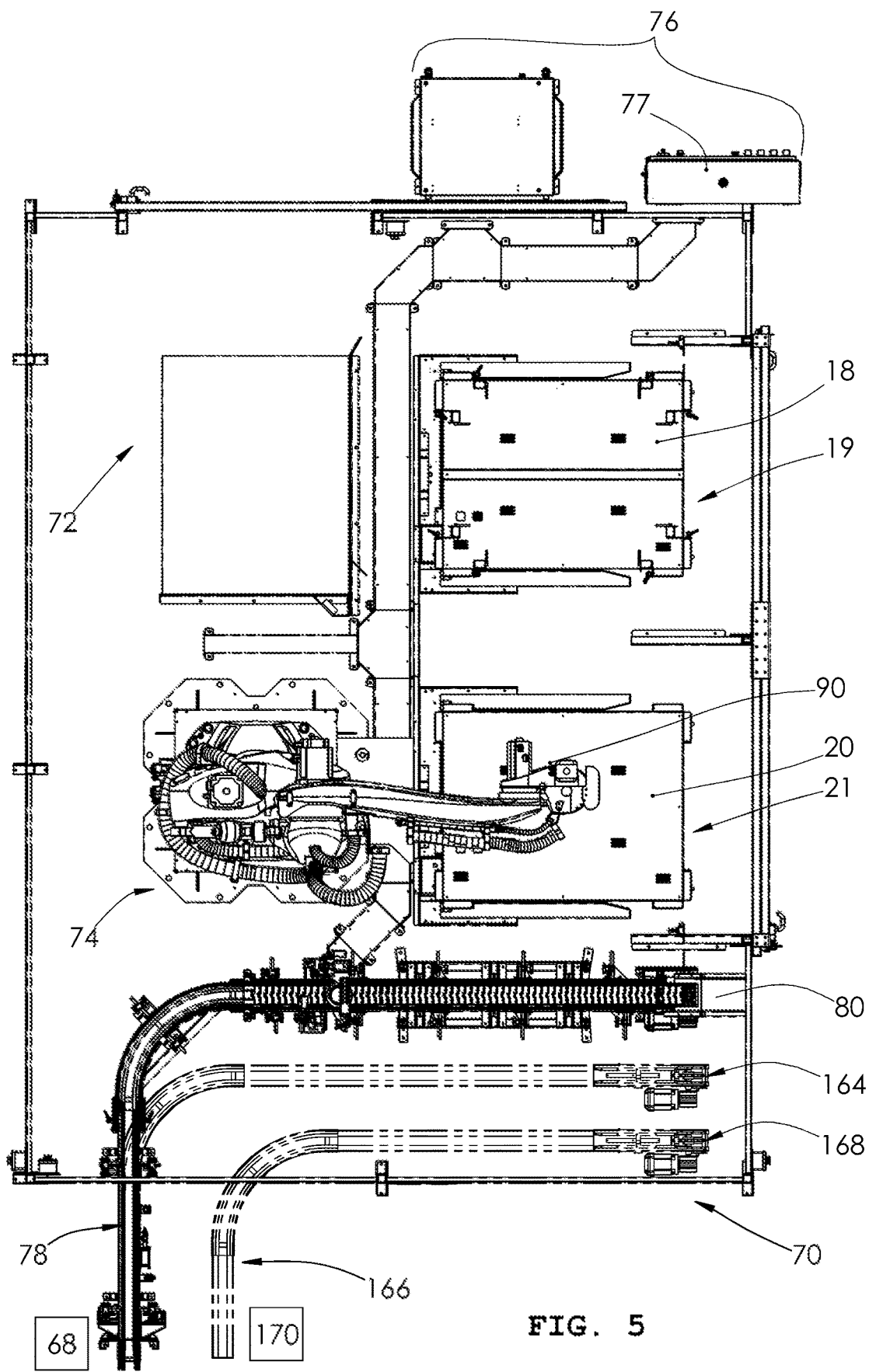
FIG. 5 is a plan view of an exemplary robotic palletizing cell of the present invention.

FIG. 5 shows an exemplary robotic palletizing cell 70 for building palletized articles 10 (FIG. 1). A control system or controller 76, such as a microprocessor, controls the operation of components in palletizing cell 70, including an operator interface 77, all of which operates in a known manner and is not further discussed herein. Palletizing cell 70 includes a location or stacking area 72 that has a horizontal support surface for receiving a pallet 12 (FIG. 1) and a covering or slip sheet 18 from a covering storage area 19 overlying pallet 12 for providing a horizontal support surface for the palletized articles 10. Alternately, instead of a slip sheet, a tray having a peripheral flange or other component can be used to achieve separation between adjacent article arrays 16 (FIG. 1). As further shown in FIG. 5, palletizing cell 70 includes an article conveyor 78 extending to a collection area 80 which provides a horizontal surface for supporting an article row (e.g., article row 148 (FIG. 9)) received from an article row source 68 to article conveyor 78. A robot 74 such as an anthropomorphic robot includes an end effector or end of arm tooling or article handling head 90 for transporting or moving the article row from collection area 80 to stacking area 72, becoming, for example, article row A (FIG. 3A). Robot 74 directs article handling head 90 to subsequently transport additional article rows from collection area 80 to stacking area 72, i.e., article rows B through N, forming first article array 44 (FIG. 3A). Robot 74 then directs article handling head 90 to covering storage area 19 to receive a slip sheet 18 and then transport and overlay slip sheet 18 on first article array 44 (FIG. 3A). A second article array 46 (FIG. 3D) is then constructed by robot 74 directing article handling head 90 to sequentially transport article rows from collection area 80 to stacking area 72, becoming article rows N+1 through 2N of the second article array 46. Slip sheets 18 are inserted between subsequently constructed article arrays 16 (FIG. 1), with the top article array being overlain with a top frame or covering 20 provided from covering storage area 21, thereby completing the construction of palletized articles 10.

As shown in FIG. 6, article handling head or head 90 is now discussed. Head 90 includes a frame 94 having a fitting 92 for connecting to robot 74 (FIG. 5) that manipulates head 90 for building palletized articles. Head 90 includes a pair of gripping members 96 comprising elongate substantially planar gripping members 98, 100. Gripping members 98, 100 are maintained parallel to one another, which permits the gripping members to accommodate and manipulate differently sized articles capable of constructing one palletized article from a first article followed by constructing another palletized article from a different second article sized differently from the first article, or capable of constructing a palletized article such as by utilizing the first article for constructing an article array, and then utilizing the second article for constructing a different article array within the same palletized article without requiring a change-out of head 90 or modification of components, such as gripping members 98, 100, thereby saving down-time, and by minimizing the number of article handling heads 90, reducing production costs. In one arrangement, gripping members 98, 100 are positioned side-by-side at substantially the same vertical position relative to one another. Secured to frame 94 is a support structure 101 that further secures an end 112 of an actuator 110, such as a pneumatic actuator, with the opposite end 114 of actuator 110 pivotably connected via a fastener 118 extending through mutually aligned openings of a pair of opposed brackets 116 and end 114 of actuator 110. The opposed brackets 116 are secured to a flange 108 extending generally perpendicularly from gripping member 98. Each of a pair of rods 106 secured at one end to flange 108 are slidably guided by a corresponding bearing 104 and block 107 secured to support structure 101. As a result of the distance between ends 112, 114 of actuator 110 being changed during operation of actuator 110, gripping member 98 is actuated along guided movement direction 84 (FIG. 7), raising gripping member 98 vertically above gripping member 100.

Figure 7:
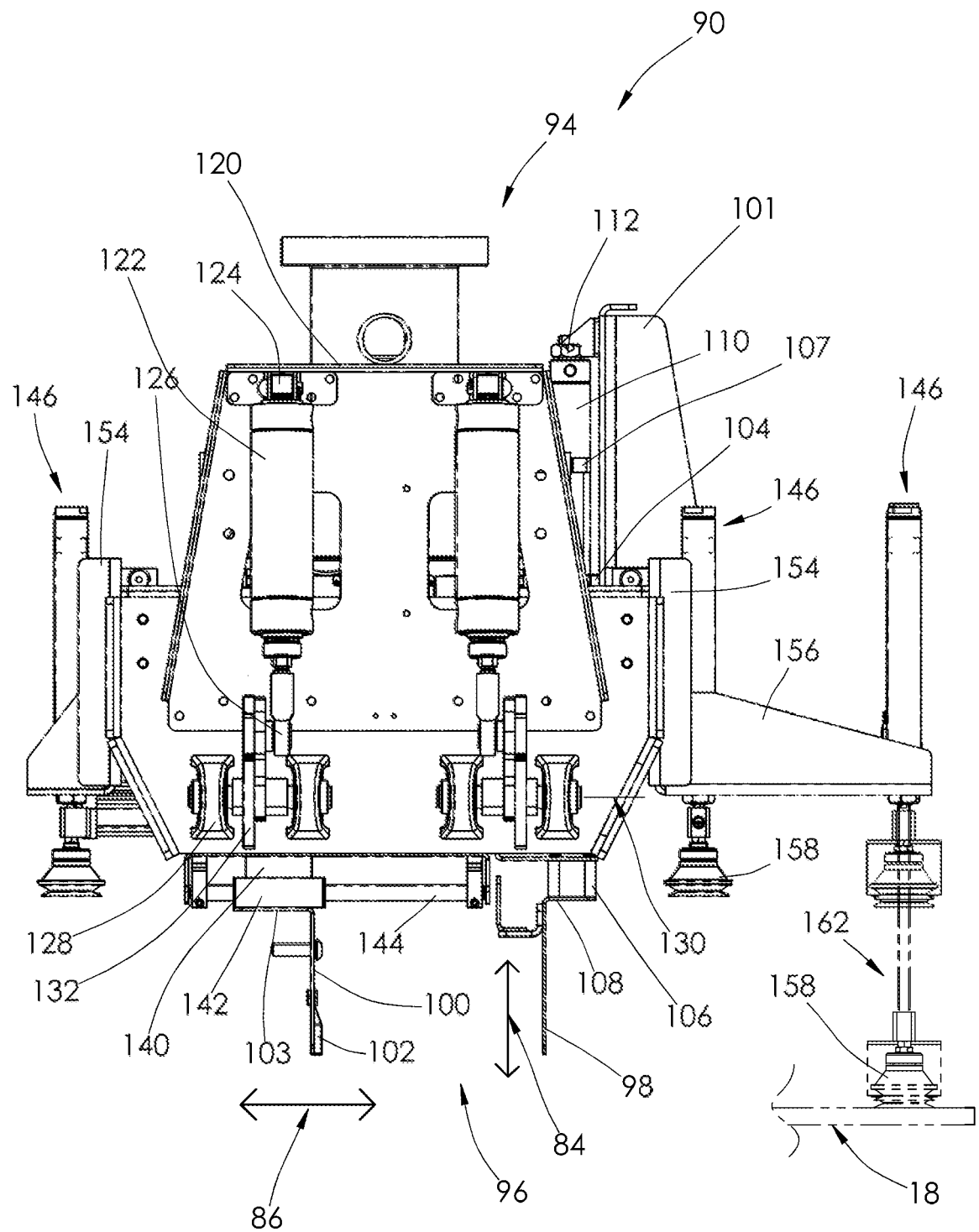
FIG. 7 is an end view of the article handling head of FIG. 6 of the present invention.
Figure 8:
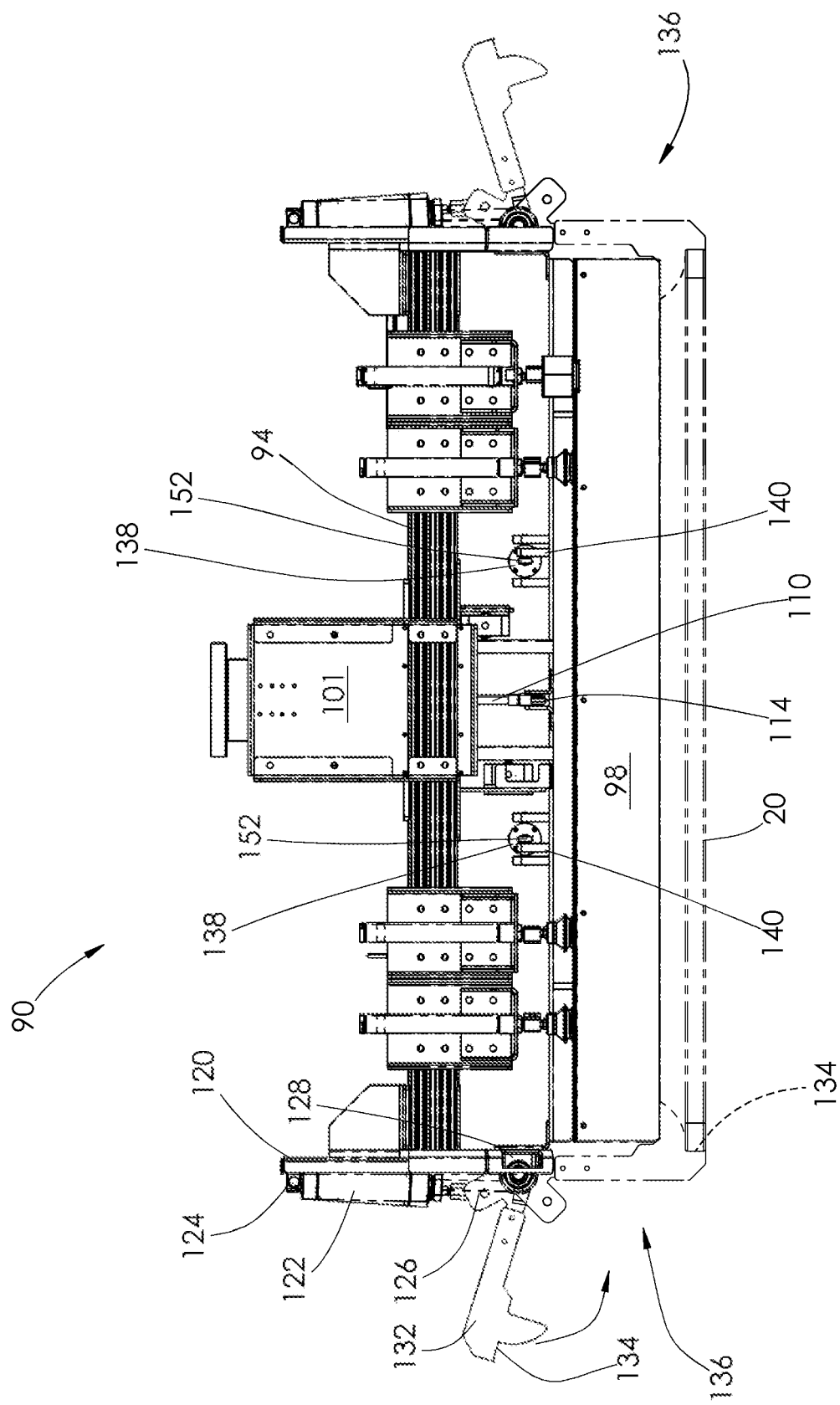
FIG. 8 is an elevation view of the article handling head of FIG. 6 of the present invention.
Figure 17:
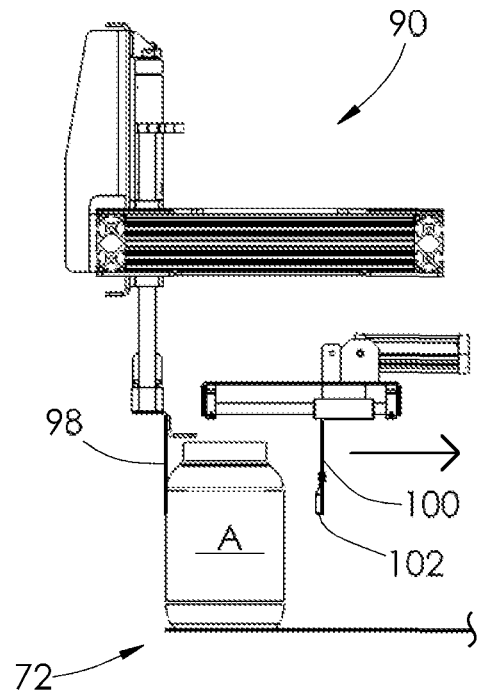

As shown collectively in FIGS. 7 and 8, gripping member 100 includes a compliant surface 102 positioned at least near an end of gripping member 100 extending away from frame 94, which compliant surface 102 faces a corresponding surface of gripping member 98. In one embodiment, compliant surface 102 may extend along the entire length of gripping member 100. As shown, gripping member 100 extends generally perpendicularly to a flange 103 that is secured to a pair of blocks 142 at one end of a respective linkage 140 (only one block 142 and linkage 140 is shown in FIG. 7). Each block 142 is slidably movable in a horizontal movement direction 86 along a corresponding guide rod assembly 144 secured to frame 94. The other end of each linkage 140 is movably secured to an end 152 of a rod of a corresponding actuator 138 (FIG. 8) operably connected to frame 94. Each rod of actuator 138 is oriented generally parallel to a guide rod 143 of a corresponding guide rod assembly 144 (FIG. 7). In response to the rod end 152 of each actuator 138 being urged into movement relative to the body of actuator 138 by controller 76 (FIG. 5), linkage 140 is similarly urged into movement along horizontal movement direction 86. For example, with gripping members 98, 100 positioned side-by-side at substantially the same vertical position relative to one another and at least partially laterally surrounding an article row 148 (FIG. 14), in response to rod ends 152 being actuated in one direction, gripping member 100 is similarly urged toward gripping member 98 (FIG. 15), resulting in gripping members 98, 100 applying a compressive force to the article array, such as article array 148 (FIG. 15) positioned between gripping members 98, 100. Compliant surface 102 of gripping member 100 in combination with the facing surface of gripping member 98 helps maintain a sufficient frictional force therebetween, permitting the article row to be transported between different locations. Conversely, in response to rod ends 152 being actuated in the other direction, gripping member 100 is sufficiently urged away from gripping member 98 (FIG. 17), resulting in removal of the compressive force applied by gripping members 98, 100 to the article array, such as article array A (FIG. 17) positioned between gripping members 98, 100. In summary, vertical movement direction 84, which corresponds to the movement direction of gripping member 98, and horizontal movement direction 86, which corresponds to the movement direction of gripping member 100, are perpendicular to one another, which will be discussed with regard to article row manipulation in further detail below.

As further shown in FIGS. 6-7, a plurality of cover handling devices 146 are secured to corresponding support structures 154, 156 that are secured to frame 94. Cover handling devices 146 are shown in a retracted position. Cover handling devices 146, which include respective actuators 160, such as a pneumatic actuators, further include suction members 158 secured to corresponding ends of the actuators. In order to pick up a covering such as a tray or slip sheet 18 (FIG. 5), robot 74 (FIG. 5) positions head 90 vertically above the appropriate covering storage area such as covering storage area 19 (FIG. 5). Suction members 158 of the cover handling devices 146 are urged toward an extended position 162 (FIG. 7) that is in contact with the tray or slip sheet 18. As a result of applying a suction pressure by each suction member 158, the tray or slip sheet 18 is secured to the suction members 158 for placement over a pallet or article array at stacking area 72 (FIG. 5).

As further collectively shown in FIGS. 6-8, a cover handling device 136 such as for moving a covering such as a top frame 20 (FIG. 1) is now discussed. Cover handling device 136 includes a pair of actuators 122, such as pneumatic actuators having opposed ends 124, 126. Ends 124 are pivotably connected to a support structure 120 that is secured to frame 94. Ends 126 are each pivotably connected to a crank 132 that is pivotably connected to rotate about an axis 130 of a corresponding rotational guide assembly 128 secured to frame 94. Crank 132 extends to an engagement feature 134. In order to pick up a top frame 20 (FIG. 5), robot 74 (FIG. 5) positions head 90 vertically above the appropriate covering storage area such as covering storage area 21 (FIG. 5). In response to increasing the distance between opposed ends 124, 126 of actuator 122, crank 132 is urged into sufficient rotational movement about axis 130 such that each engagement feature 134 engages top frame 20 as depicted in FIG. 8 for placement over a pallet or article array at stacking area 72 (FIG. 5).

Figure 2A:
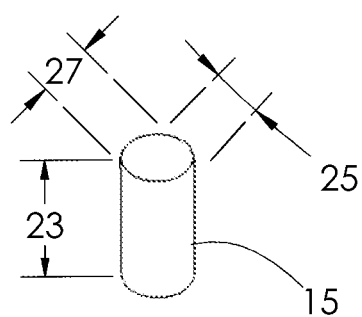
FIG. 2A is a perspective view of an exemplary article of the present invention.

As a result of the novel features of the article handling head 90 (FIG. 5) previously discussed being incorporated into palletizing cell 70 (FIG. 5), article rows 14 (e.g., rows A-N of FIG. 3A) (FIG. 2) can be efficiently constructed, forming article arrays 16 (FIG. 1), and by continuing to form additional article arrays 16, palletized articles 10 (FIG. 1) may be constructed. In addition, by virtue of unique features of gripping members 98, 100, the same article handling head 90 may accommodate differently sized articles 14, 15 (see FIGS. 2 and 2A) wherein at least one of the height 22, width 24 and length 26 of article 14 is different from the height 23, width 25 and length 27 of article 15, as well as permitting different article array arrangements, such as nested arrangement 48 (FIG. 3A), non-nested closely spaced arrangement 54 (FIG. 4A), and non-nested non-closely spaced arrangement (FIG. 4C). For example, in combination with elongate gripping members 98, 100 which selectably apply a sufficient compressive force to compressibly grip an article row for transporting the article row between different locations, the guide rod assembly 144 (FIG. 7) is movable by actuator 138 along an extended length, capable of accommodating articles having a considerable range of sizes. When the actuator 138, such as a pneumatic actuator applies substantially the same closing force or compressive force anywhere along guide rod assembly, which force being sufficient to compressively grip the article row for transport, but not sufficient to deform or damage the article row, the article handling head of the present invention can accommodate, without modification or change out, a vast majority of the range of sizes of articles suitable for palletizing. Optionally, for thicker or heavier articles, as well as thinner articles, the operator interface may include a weight parameter that could change the magnitude of compressive force to accommodate such article rows.

Each rod of actuator 138 is oriented generally parallel to a guide rod 143 of a corresponding guide rod assembly 144 (FIG. 7). In response to the rod end 152 of each actuator 138 being urged into movement relative to the body of actuator 138 by controller 76 (FIG. 5), linkage 140 is similarly urged into movement along horizontal movement direction 86.

Moreover, as a result of operator interface 77 (FIG. 5) of controller 76 (FIG. 5), the operator has automated article row processing options not previously available. For example, in one embodiment, an operator (not shown) may be provided with an opportunity to input multiple parameters relating to the construction of palletized articles comprised of article arrays 44 (FIG. 3A), each article array having a plurality of article rows A through N comprised of first articles 14 (FIG. 2) extending in one of an x-direction and a y-direction within a rectangular areal footprint in the x-direction and the y-direction, having the x-dimension and the y-dimension of a covering or slip sheet 18 comprising: inputting parameters including a height dimension 22, a width dimension 24 and a length dimension 26 of a first article 14 (FIG. 2), a dimension 28 of the rectangular areal footprint (see FIG. 3A) in the x-direction, a dimension 30 of the rectangular areal footprint in the y-direction, a dimension of a width of article rows 44 to be provided from an article row source 68 (FIG. 5), a type of arrangement, such as nested arrangement 48 (FIG. 3A), non-nested closely spaced arrangement 54 (FIG. 4A) and non-nested non-closely spaced arrangement 58 (FIG. 4C) to be used between adjacent article rows (A through N) for building the first article arrays 44, and the direction (x-direction or y-direction) and length dimension (respective dimensions 28, 30) of the article rows (A through N). In response to the parameters being input, controller 76 (FIG. 5) controls a number of articles contained in a first row (e.g., row A) of first articles 14, and each subsequent row of first articles 14. That is, once the parameter have been input by the operator, the controller 76, in a known manner, executes software source code or an alogorithm directed to calculating the maximum numbers of article rows and the numbers of articles in each article row, including edge spacing, as well as the gaps/overlaps between adjacent rows, depending upon the type of arrangement selected by the operator.

Figure 9:
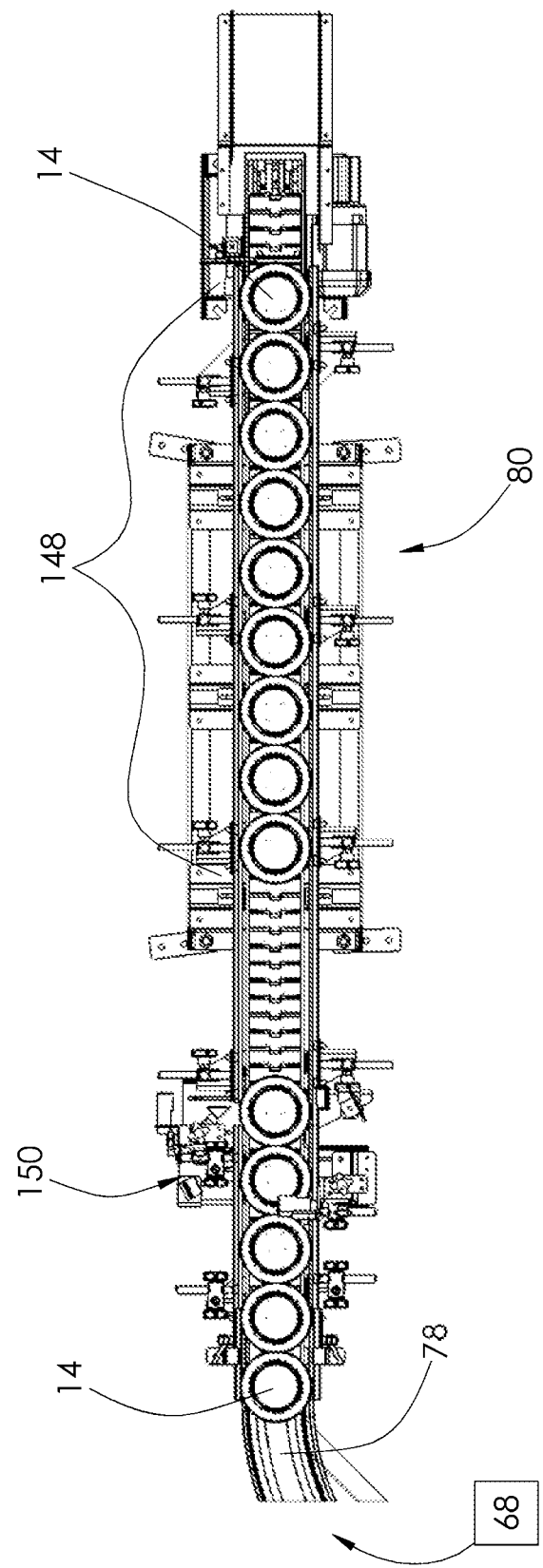
FIG. 9 is a partial plan view of an exemplary article conveyor and collection area of the present invention.

The operation of the robotic palletizing cell 70 (FIG. 5) which manipulates articles to ultimately form a palletized article is now further discussed. As shown in FIG. 9, articles 14 received from article row source 68 are provided along article conveyor 78 and monitored by a sensor group 150 controlled by a controller 76 (FIG. 5) such as by counting the number of articles 14 breaking a beam (not shown) directed transverse to the direction of articles moving along article conveyor 78 and selectively interrupting the flow of articles 14, resulting in the formation of an article row 148 at collection area 80 containing a predetermined or controlled number of articles 14, from controller 76 calculations based from the operator-entered parameters previously discussed. A more detailed discussion of the operations relating to the article conveyor and collection area is contained in Applicant's U.S. Pat. No. 7,634,894 titled "System And Method For Palletizing Articles" and co-pending U.S. patent application Ser. No. 15/410,317 titled "System And Method For Forming And Moving An Article Array" which are each hereby incorporated by reference in their entirety.

Figure 10:
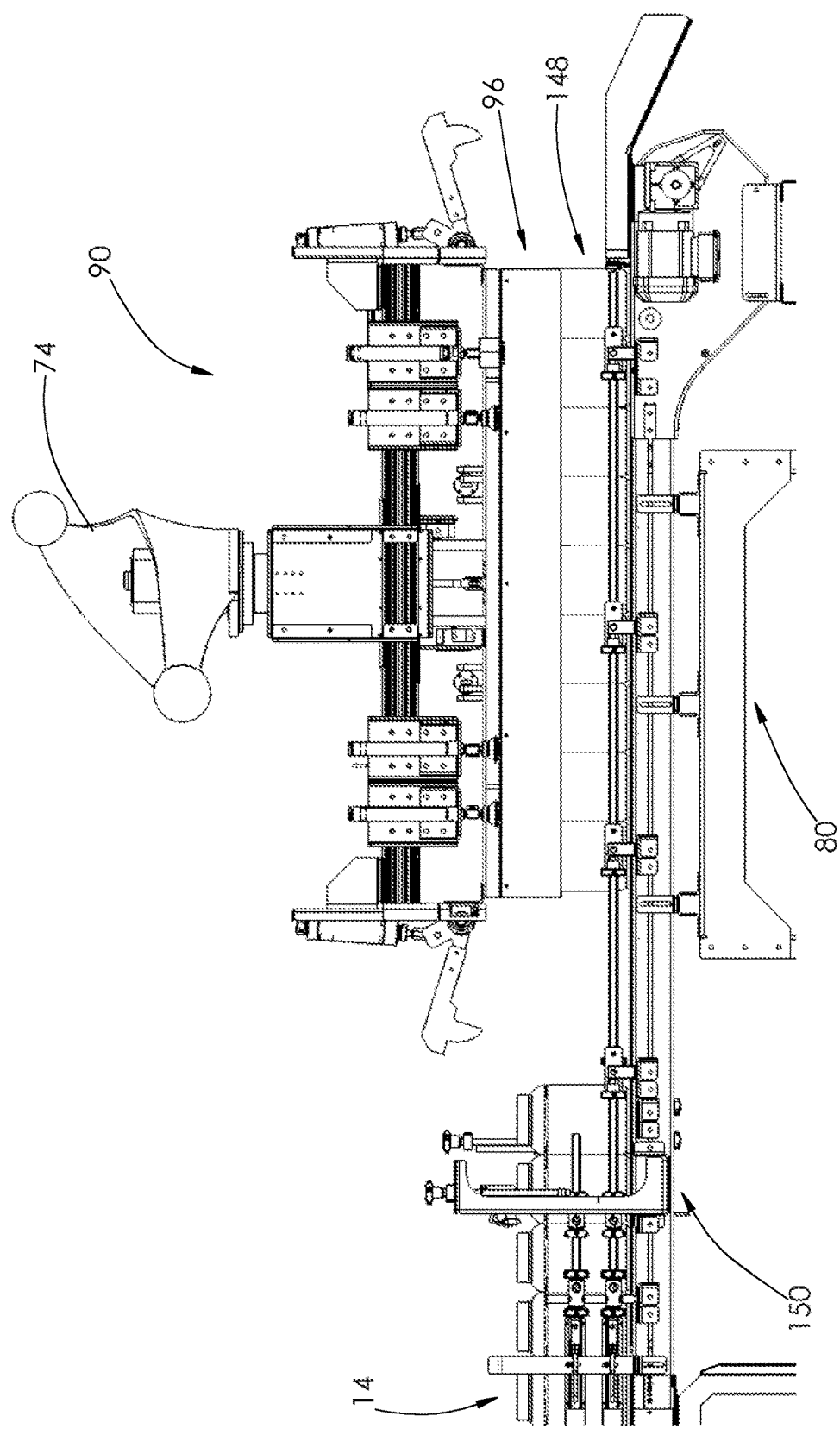
FIG. 10 is an elevation view of an exemplary article handling head engaging an exemplary row of articles supported by the collection area of FIG. 9 of the present invention.
Figure 11:
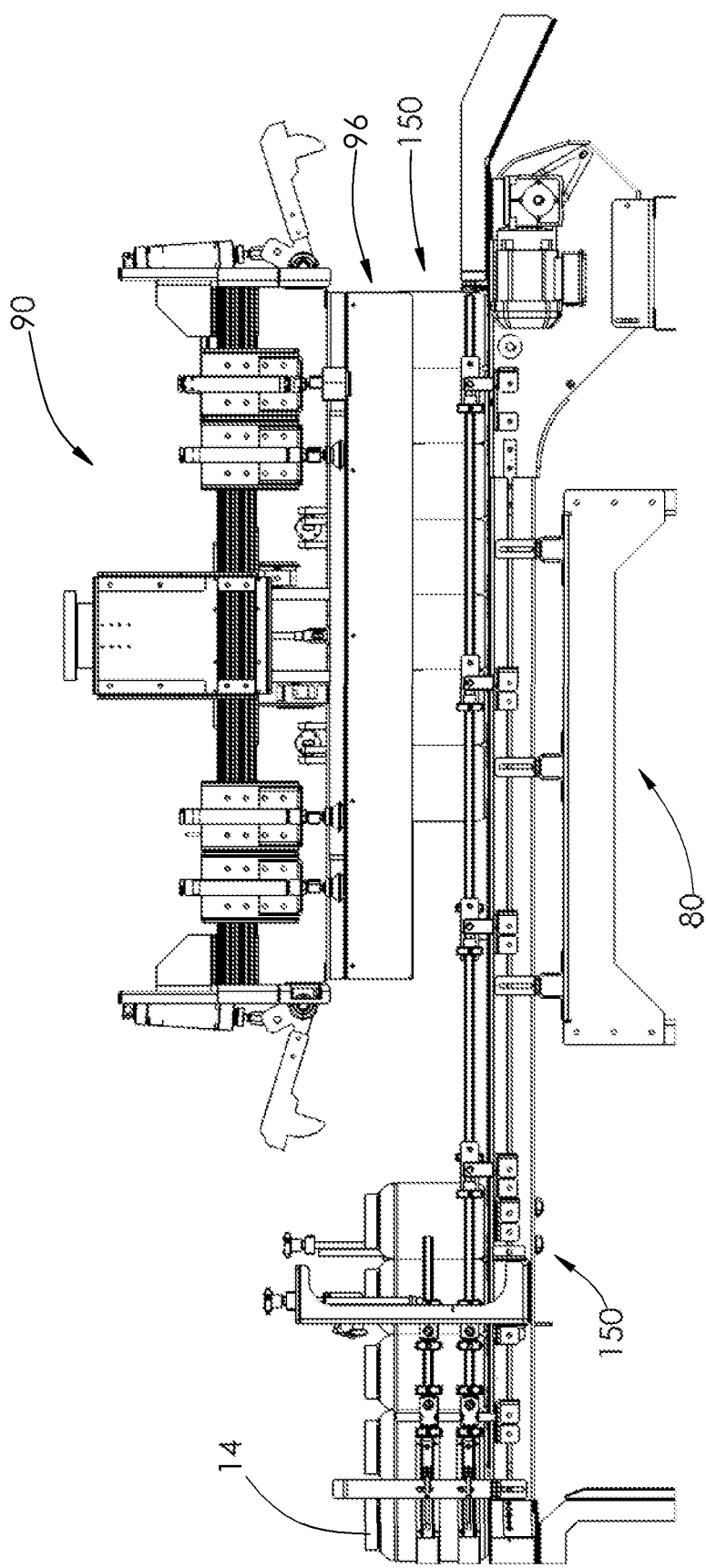
FIG. 11 is an elevation view of an exemplary article handling head engaging an exemplary row of articles supported by the collection area of FIG. 9 of the present invention.
Figure 14:
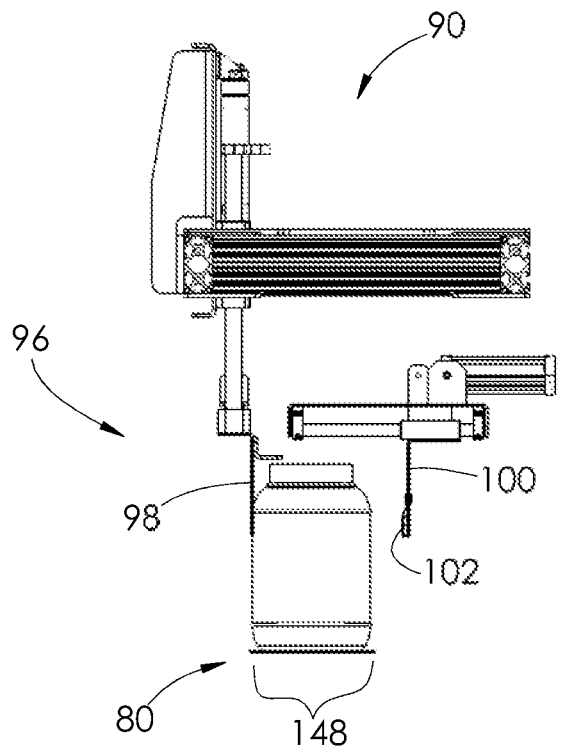
FIGS. 14-15 show sequential steps of an exemplary article handling head engaging an article row supported by an exemplary collection region of the present invention.

Once article row 148 is collected at and supported by a horizontal surface of collection area 80, as shown in FIGS. 10 and 14, robot 74 positions head 90 such that the pair 96 of gripping members 98, 100 at least partially laterally surround article row 148. As appreciated by one having ordinary skill in the art, gripping members 98, 100 are sized to accommodate or at least partially laterally surround each article of an article row containing the maximum number of articles required to form an article array, such as shown in row A of article array 44 of FIG. 3A. Of course, as shown in FIG. 11, gripping members 98, 100 are also sized to accommodate for (at least partially laterally surrounding) (FIG. 14)) each article of an article row containing less than the maximum number of articles required, such as article row 150 (FIG. 11) shown supported by the horizontal surface of collection area 80.

Figure 15:
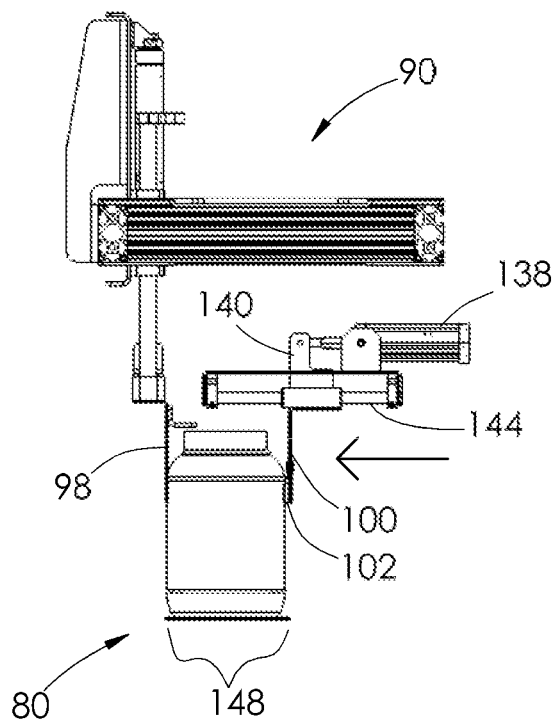

Once gripping members 98, 100, as shown in FIG. 14 have at least partially laterally surrounded article row 148 at collection area 80, then as further shown in FIG. 15, as a result of actuation of actuator 138, gripping member 100 is urged in a direction parallel to the horizontal support surface of collection area 80 toward gripping member 98, applying a compressive force to opposed laterally surrounded surfaces of article row 148. A frictional force between gripping members 98, 100 and the corresponding facing surfaces of the article row are sufficient to permit head 90 (FIG. 6) to transport article row 148 away from collection area 80.

Figure 16:
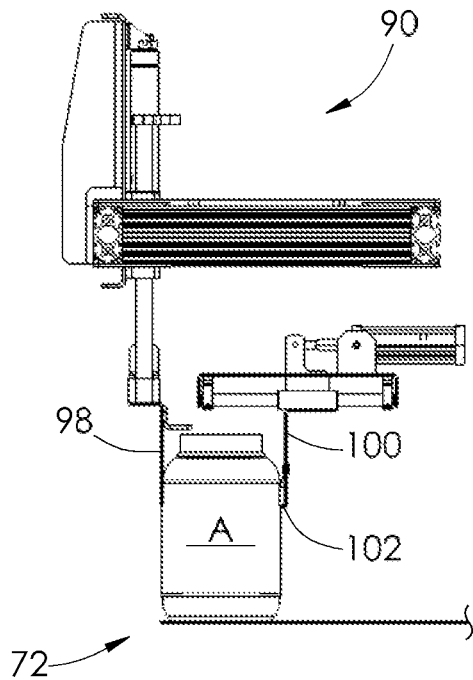
FIGS. 16-26, 26A, and 27-30 show sequential steps of an exemplary article handling head building an exemplary article array supported by an exemplary stacking area of the present invention.
Figure 18:
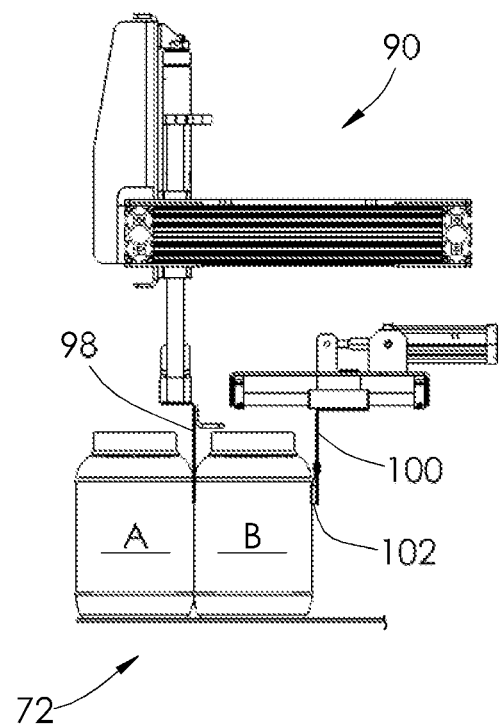

For purposes of clarity and brevity, article rows formed on and supported by collection area 80 will continue to be identified as article row 148, with the article rows 148 transported from collection area 80 being re-identified upon being moved to, placed on, and supported by the horizontal surface of stacking area 72 of the robotic palletizing cell 70 (FIG. 5). Therefore, as collectively shown in FIGS. 5 and 16 and 17, article 148 becomes article row A (e.g., FIG. 3A) when transported from collection area 80 to stacking area 72. The article rows positioned at stacking area 72, as shown in FIG. 3A, extend in the x-direction, which would have previously been selectively input by the operator as previously discussed. As shown in FIG. 16, row A is positioned on and supported by stacking area 72. Upon row A being positioned on stacking area 72, as further shown in FIG. 17, gripping members 98, 100 are moved away from one another sufficiently to remove the compressive force applied to row A, as previously discussed. Once the compressive force applied to row A has been removed, head 90 is returned to collection area 80 such that gripping members 98, 100 at least partially laterally surround a subsequently formed article row 148 as shown in FIGS. 9 and 14, followed by gripping members 98, 100 applying a compressive force to article row 148 as shown in FIG. 15, as previously discussed. In a manner as previously discussed and as shown in FIG. 18, the subsequently formed article row 148 becomes row B upon being transported from collection area 80 and being positioned in close proximity to row A at stacking area 72, with gripping member 98 positioned between adjacent rows A, B. Once gripping member 98 is positioned between adjacent rows A, B as shown in FIG. 18, as further shown in FIG. 19, gripping members 98, 100 are moved away from one another sufficiently to remove the compressive force applied to row B, as previously discussed.

Figure 19:
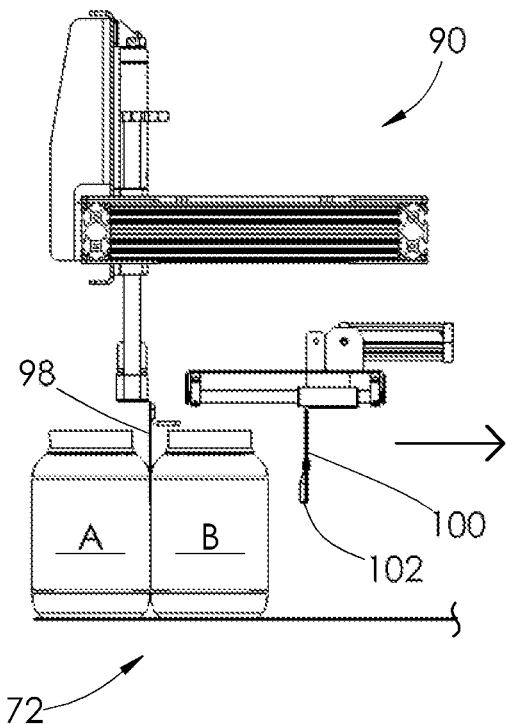
Figure 20:
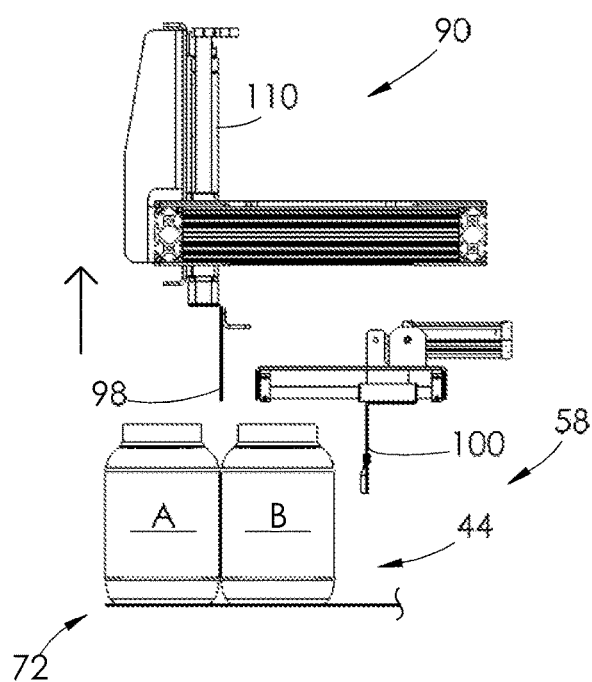

Once rows A, B are arranged as shown in FIG. 19, depending upon which article row arrangement was selected by the operator, i.e., nested arrangement 48 (FIG. 3A), non-nested closely spaced arrangement 54 (FIG. 4A), or non-nested non-closely spaced arrangement 58 (FIG. 4C), different movements by gripping members 98, 100 may occur. For example, if the operator had selected nested arrangement 48 (FIG. 3A) or non-nested closely spaced arrangement 54 (FIG. 4A), then as shown in FIG. 20, gripping member 98 is raised in a direction, such as a vertical direction that is perpendicular to and away from the support surface of stacking area 72. However, if the operator had selected non-nested non-closely spaced arrangement 58 (FIG. 4C), raising gripping member 98 in a vertical direction that is perpendicular to and away from the support surface of stacking area 72, as shown in FIG. 20 is optional, prior to head 90 being returned to collection area 80 such that gripping members 98, 100 at least partially laterally surround a subsequently formed article row 148 as shown in FIGS. 9 and 14, followed by gripping members 98, 100 applying a compressive force to article row 148 as shown in FIG. 15, as previously discussed.

Figure 21:
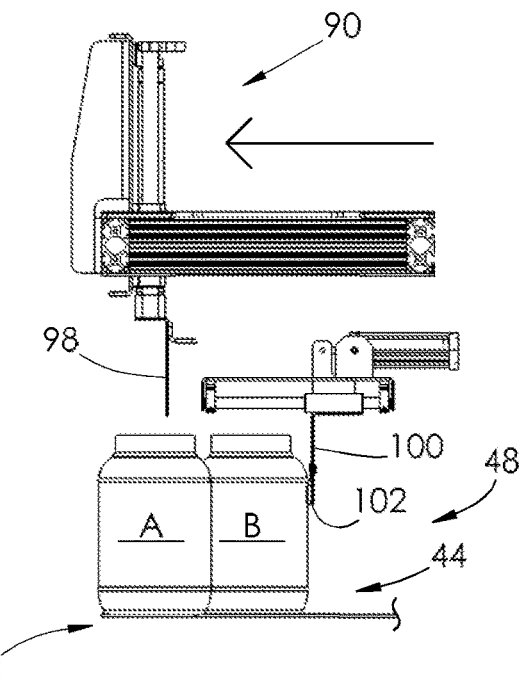
Figure 22:
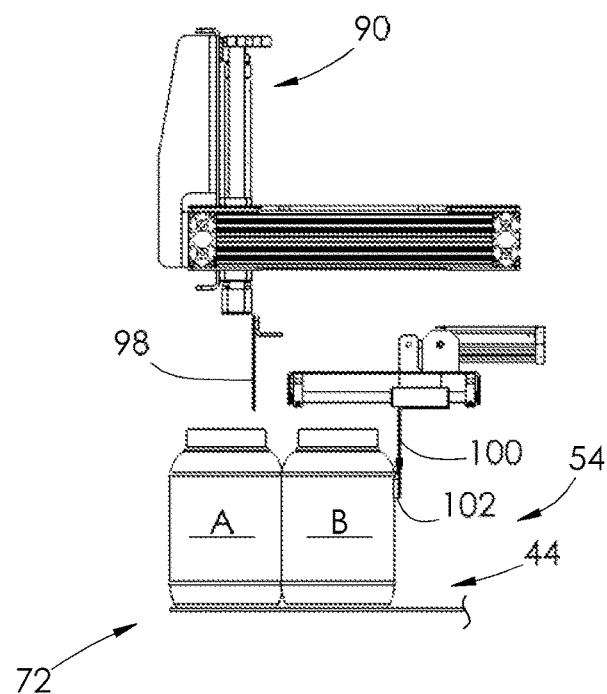

Once gripping member 98 is raised in a direction, such as a vertical direction that is perpendicular to and away from the support surface of stacking area 72 as shown in FIG. 20, and if the operator had selected nested arrangement 48 (FIG. 3A) or non-nested closely spaced arrangement 54 (FIG. 4A), then as shown in FIG. 21 (for nested arrangement 48), head 90 is moved in a lateral direction parallel to stacking area 72 such that gripping member 100 of the pair of gripping members urges row B into a nested arrangement relative to row A, or as shown in FIG. 22 (for non-nested closely spaced arrangement 54), head 90 is moved in a lateral direction parallel to stacking area 72 such that gripping member 100 of the pair of gripping members urges row B toward row A, but not in a nested arrangement (e.g., rows A and B in contact with each other, or at least separated by a gap that is less than the thickness of gripping member 98). However, if the operator had selected non-nested non-closely spaced arrangement 58, and gripping members 98, 100 and rows A, B are positioned as shown in FIG. 20, moving head 90 in a lateral direction parallel to stacking area 72 such that gripping member 100 of the pair of gripping members urges row B sufficiently into a nested arrangement relative to row A (FIG. 21) or a non-nested arrangement (FIG. 22) is optional.

Figure 23:
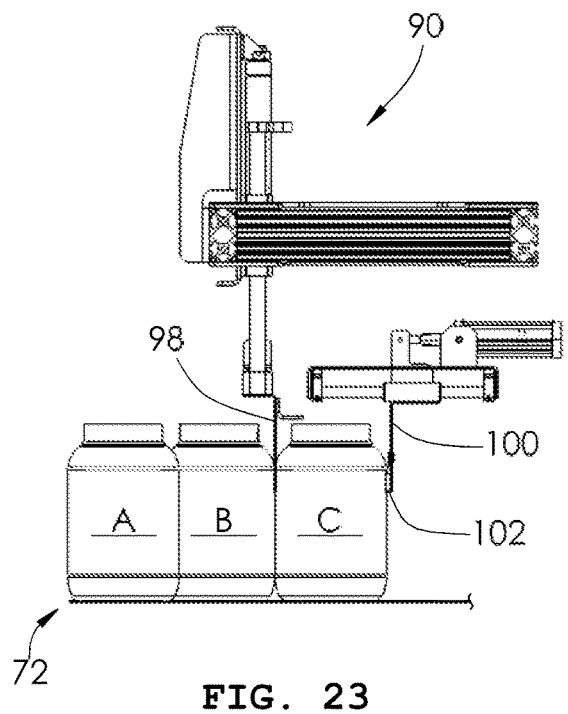

Irrespective of head 90 and rows A, B being arranged as shown in one of FIG. 20, 21 or 22 (depending upon which of arrangements 48, 54, 58 applies, as previously discussed) head 90 is returned to collection area 80 such that gripping members 98, 100 at least partially laterally surround a subsequently formed article row 148 as shown in FIGS. 9 and 14, followed by gripping members 98, 100 applying a compressive force to article row 148 as shown in FIG. 15, as previously discussed. In a manner as previously discussed and as shown in FIG. 23, the subsequently formed article row 148 becomes row C upon being transported from collection area 80 and being positioned in close proximity to row B at stacking area 72, with gripping member 98 positioned between adjacent rows B, C. Once gripping member 98 is positioned between adjacent rows B, C as shown in FIG. 23, as further shown in FIG. 24, gripping members 98, 100 are moved away from one another sufficiently to remove the compressive force applied to row C, as previously discussed.

Figure 24:
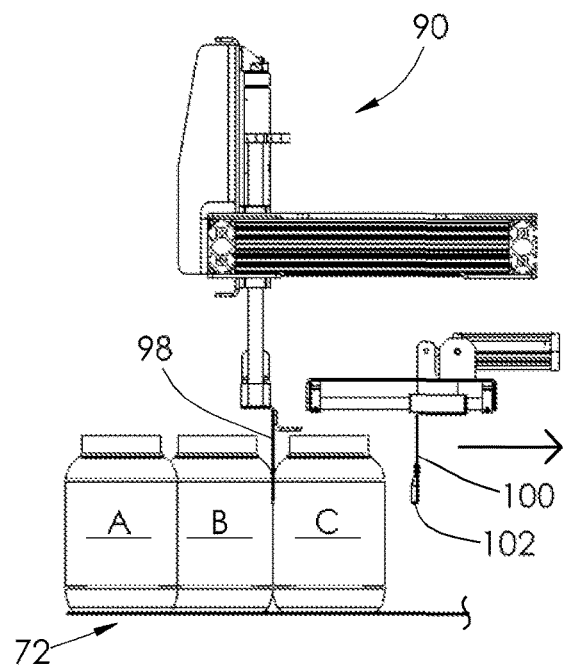
Figure 25:
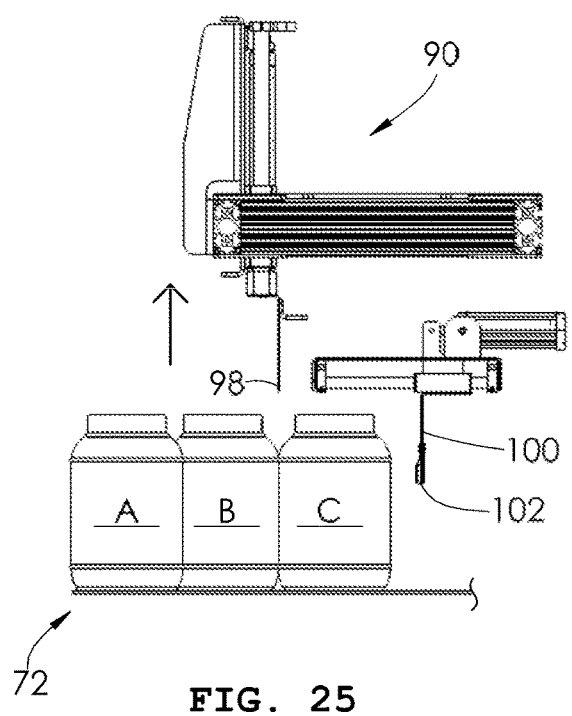

Once rows A, B, C are arranged as shown in FIG. 24, depending upon which article row arrangement was selected by the operator, i.e., nested arrangement 48 (FIG. 3A), non-nested closely spaced arrangement 54 (FIG. 4A), or non-nested non-closely spaced arrangement 58 (FIG. 4C), different movements by gripping members 98, 100 may occur. For example, if the operator had selected nested arrangement 48 (FIG. 3A) or non-nested closely spaced arrangement 54 (FIG. 4A), then as shown in FIG. 25, gripping member 98 is raised in a direction, such as a vertical direction that is perpendicular to and away from the support surface of stacking area 72. However, if the operator had selected non-nested non-closely spaced arrangement 58 (FIG. 4C), raising gripping member 98 in a vertical direction that is perpendicular to and away from the support surface of stacking area 72, as shown in FIG. 25 is optional, prior to head 90 being returned to collection area 80 such that gripping members 98, 100 at least partially laterally surround a subsequently formed article row 148 as shown in FIGS. 9 and 14, followed by gripping members 98, 100 applying a compressive force to article row 148 as shown in FIG. 15, as previously discussed.

Figure 26:
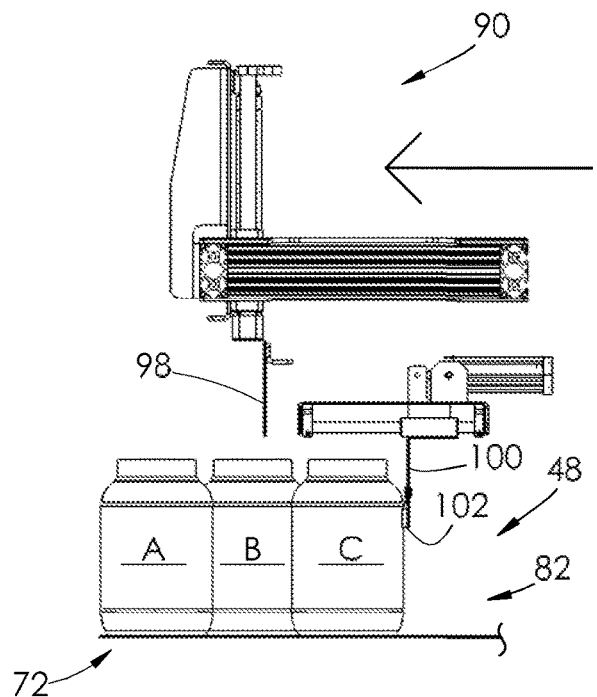
Figure 26A:
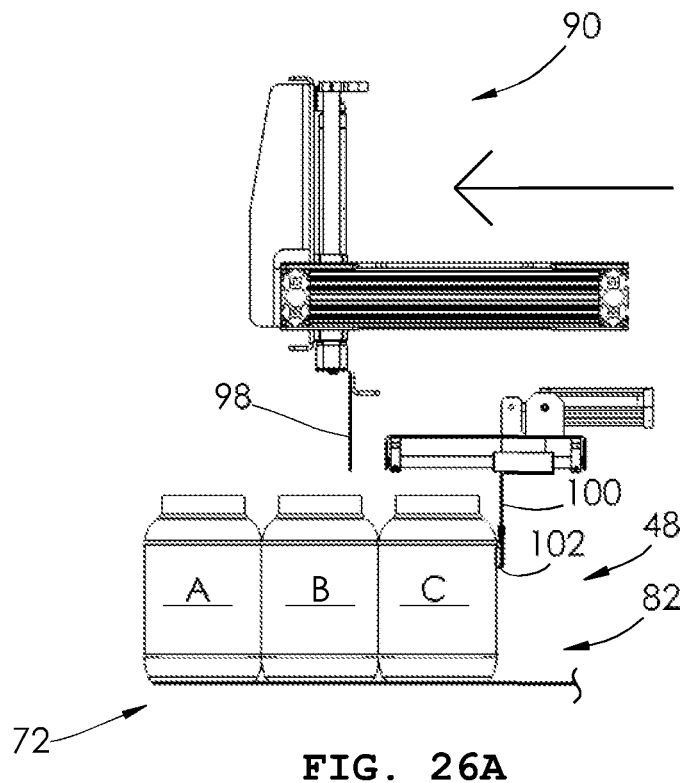
Figure 27:
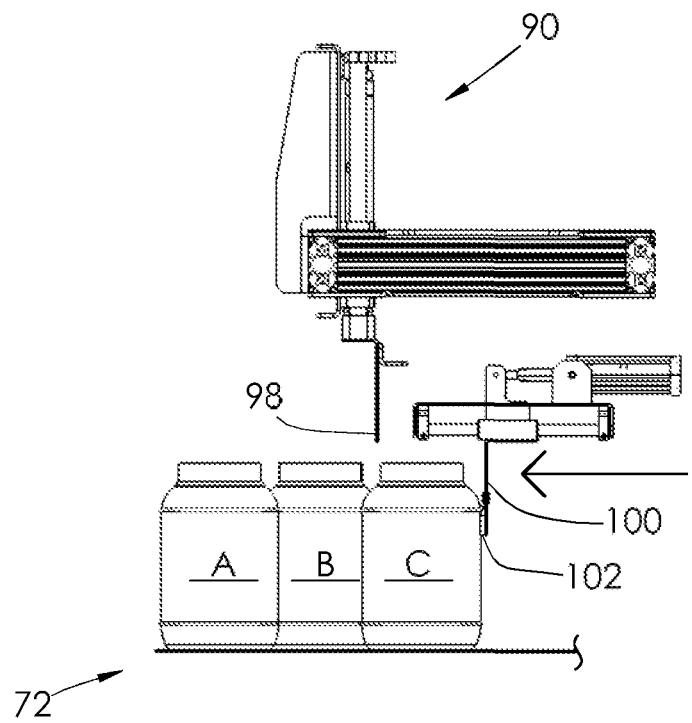

Once gripping member 98 is raised in a direction, such as a vertical direction that is perpendicular to and away from the support surface of stacking area 72 as shown in FIG. 25, and if the operator had selected nested arrangement 48 (FIG. 3A) or non-nested closely spaced arrangement 54 (FIG. 4A), then as shown in FIG. 26 (for nested arrangement 48), head 90 is moved in a lateral direction parallel to stacking area 72 such that gripping member 100 of the pair of gripping members urges row C into a nested arrangement relative to rows A, B, or as shown in FIG. 26A (for non-nested closely spaced arrangement 54), head 90 is moved in a lateral direction parallel to stacking area 72 such that gripping member 100 of the pair of gripping members urges row C toward row B, but not in a nested arrangement (e.g., rows B and C in contact with each other, or at least separated by a gap that is less than the thickness of gripping member 98). However, if the operator had selected non-nested non-closely spaced arrangement 58, and gripping members 98, 100 and rows A, B, C are positioned as shown in FIG. 25, moving head 90 in a lateral direction parallel to stacking area 72 such that gripping member 100 of the pair of gripping members urges row C sufficiently toward rows A, B into a non-nested arrangement relative to rows A, B (FIG. 26A) is optional.

Figure 12:
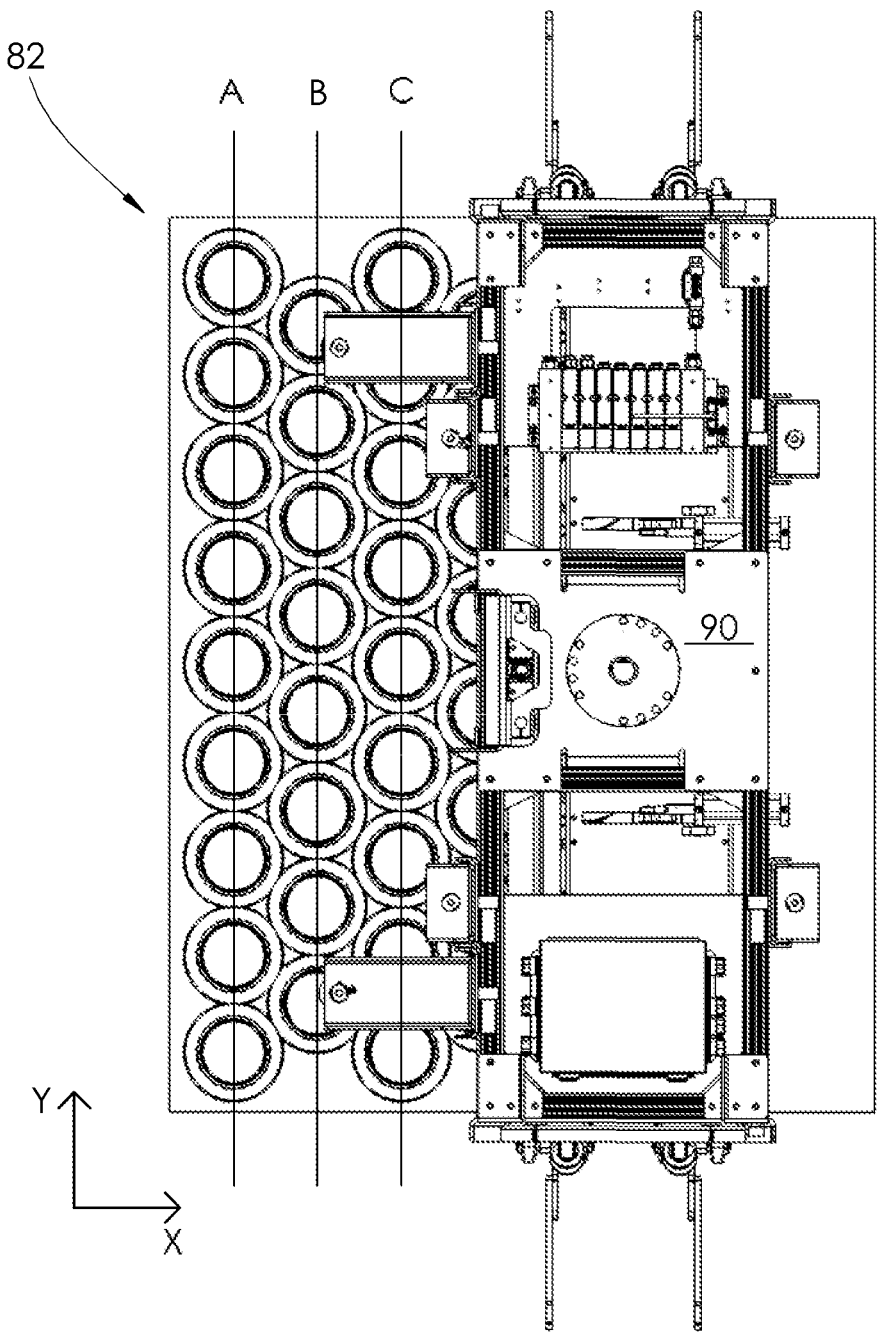
FIG. 12 is a plan view of an exemplary article handling head building a partial exemplary article array of the present invention.
Figure 13:
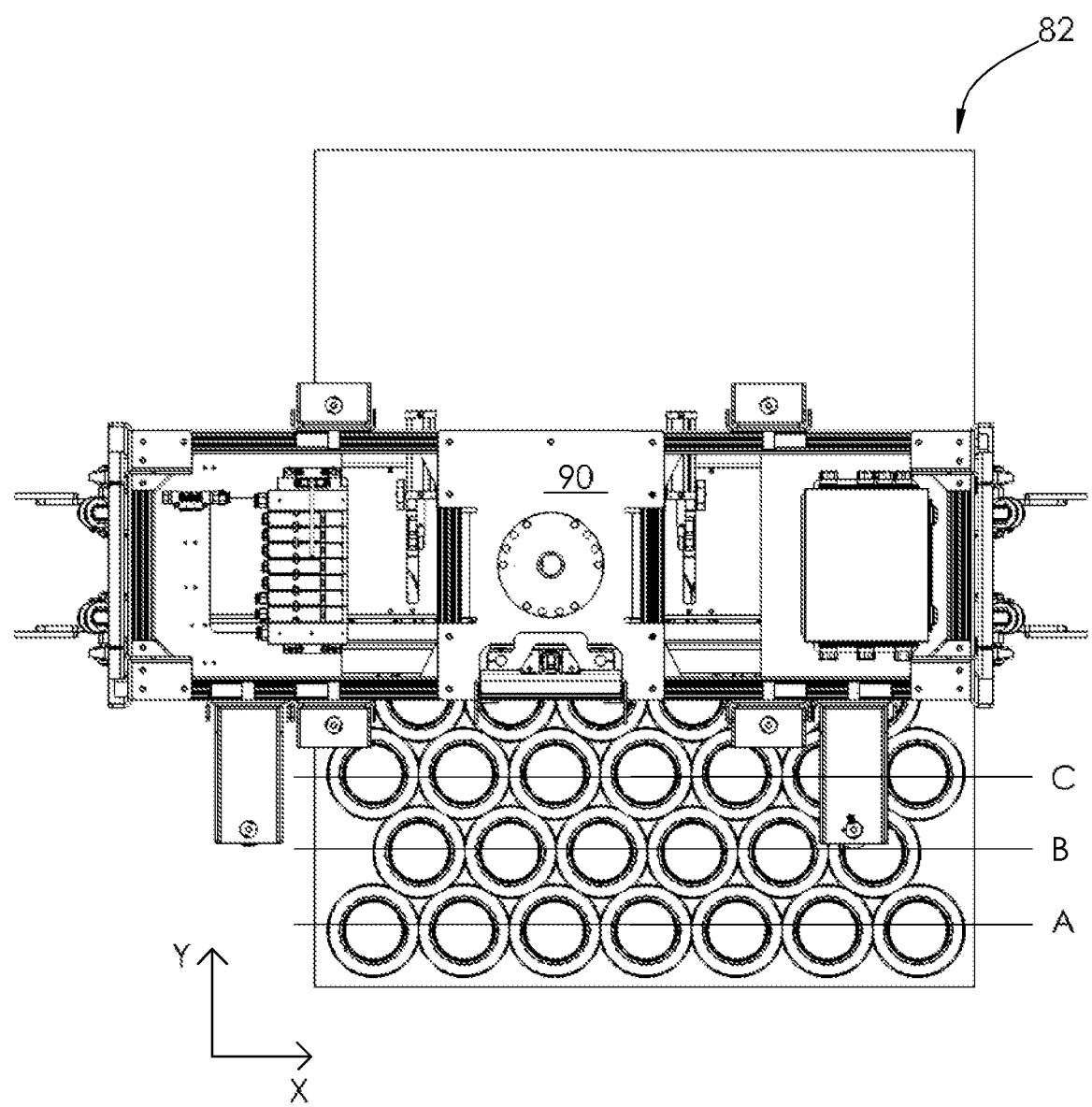
FIG. 13 is a plan view of an exemplary article handling head building a partial exemplary article array of the present invention.

FIGS. 12-13 show head 90 during construction of a partial article array 82, with the article rows (e.g., rows A, B, C fully shown) extending in the y-direction (FIG. 12) and the x-direction (FIG. 13).

Figure 28:
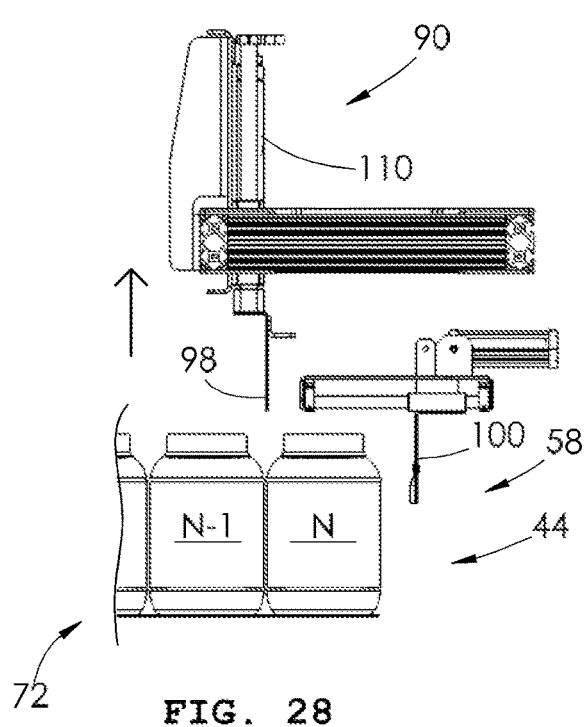
Figure 29:
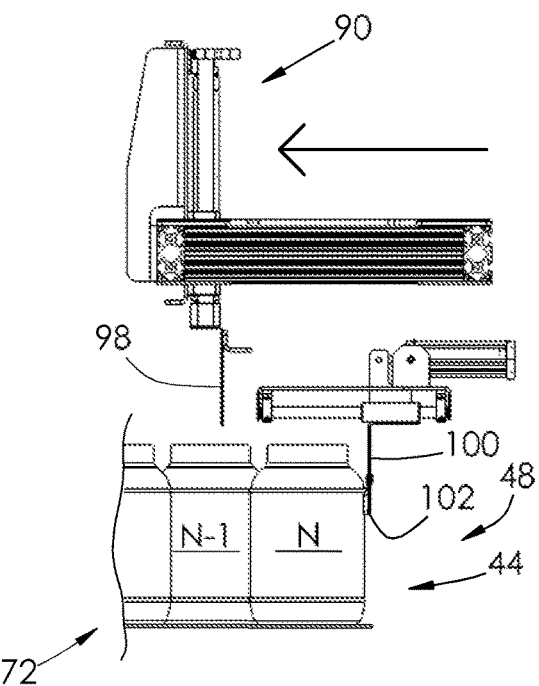
Figure 30:
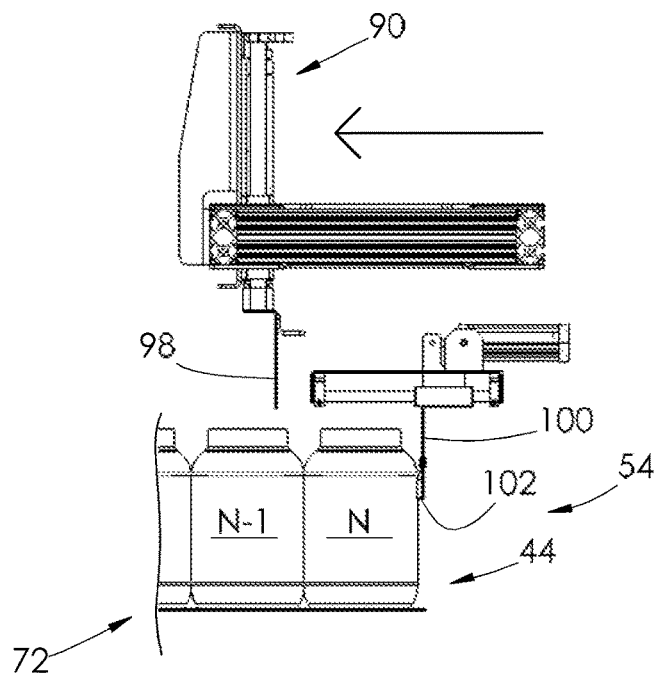

It is to be understood that the above steps for rows A-C are repeated for chronologically increasing article rows through row N, in which the arrangement and construction of FIGS. 28-30 as it relates to rows N−1, N correspond to the arrangement and construction of FIGS. A, B. For purposes of brevity the construction of additional article rows is not repeated. Once row N has been placed in the manner disclosed in the present invention, the full article array 44 has been constructed.

Once article array 44 has been constructed, head 90 utilizes cover handling device 146 in a manner previously discussed and partially shown in FIG. 18 to move head 90 to pick up a covering 18, such as a slip sheet or tray to be overlain over completed article array 44, such as shown in FIG. 1 for palletized article 10 (FIG. 1).

Figure 31:
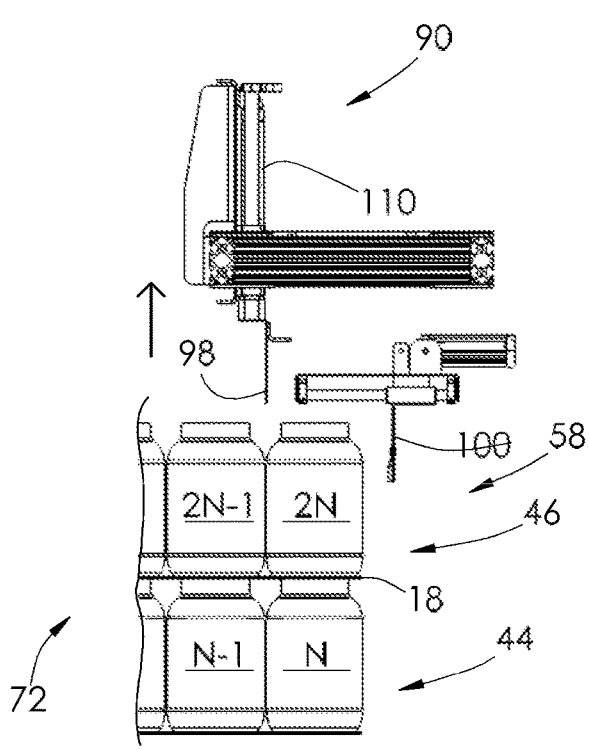
FIGS. 31-33 show sequential steps of an exemplary article handling head building an exemplary article array supported the article array of FIGS. 16-30 for building an exemplary pallet of the present invention.
Figure 32:
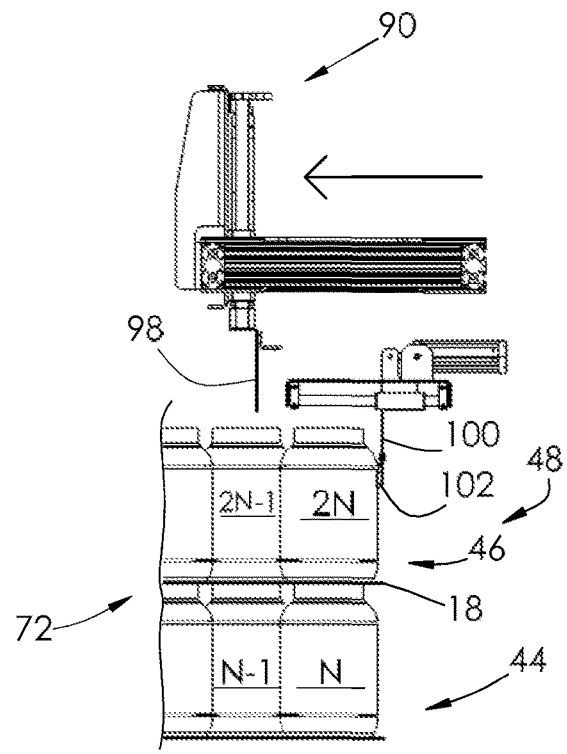
Figure 33:
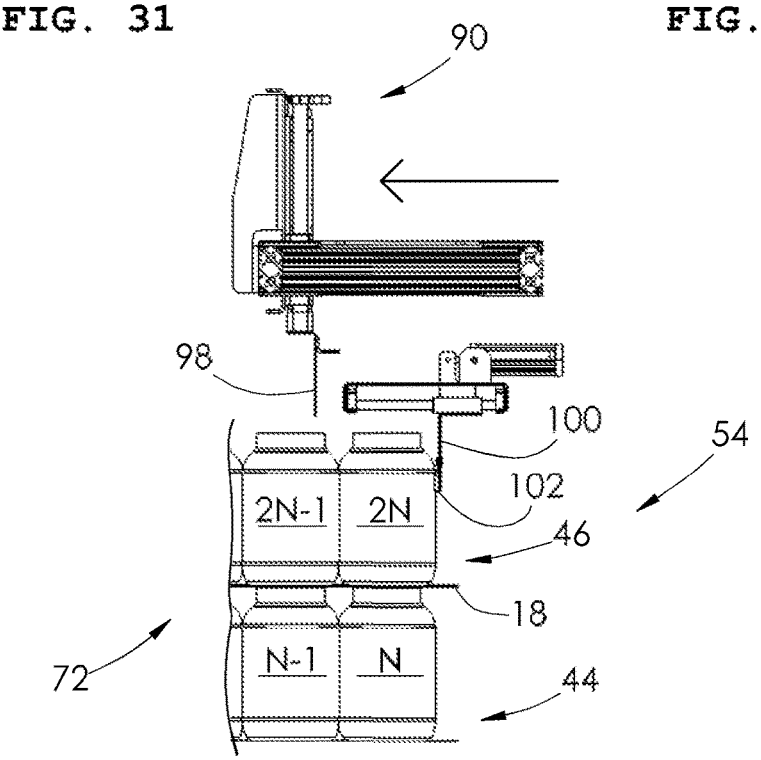

Once covering 18 has been applied over article array 44, article array 46 (FIG. 3D) having rows N+1 through 2N is constructed, the construction of which article array 46 concluding with FIGS. 31-33 (and all subsequent article rows) is essentially the same as constructing article array 44 and for purposes of brevity are not repeated herein.

Once all article rows have been constructed, head 90 utilizes covering handling device 136 (FIG. 8) for picking up and placing a covering, such as one of a top sheet and a tray or a top frame 17 (FIG. 1) over the article row, thereby constructing a palletized article.

In one embodiment, article conveyor 78 may include a second collection area 164. In one embodiment, the palletizing cell may include a second article conveyor 166 having a collection area 168 that is provided articles from an article row source 170.

It is to be understood that the article handling head which is usable for building an article array from rows of first articles, each first article having a first height, a first width, and a first length, is also usable, without requiring a change-out of or modification of components of the head, for building an article array from rows of second articles, with each second article having a second height, a second width, and a second length, wherein at least one of the second height, the second width, and the second length of the second articles is different from the first height, the first width, and the first length of the first articles.

In one embodiment, the operator may also be provided with an opportunity to input a height of the palletized articles that is different from the maximum height, if desired.

In one embodiment, instead of the operator being prompted to input all parameters, such as the article array arrangement, or direction of the article rows, the operator may be prompted to input fewer parameters, such as the size parameters of the article to be processed into a palletized article.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for building an article array comprised of a predetermined number of rows of articles, the method comprising:
   (a) positioning a head having a pair of opposed substantially planar gripping members such that the pair of gripping members at least partially laterally surrounds a first row of first articles at a first location, the first location having a horizontal first support surface for supporting the first row of first articles;
   (b) the pair of gripping members applying a compressive force parallel to the first support surface to opposed laterally surrounded surfaces of the first row of first articles;
   (c) transporting the first row of first articles from the first location to a second location, the second location having a horizontal second support surface for supporting the first row of first articles;
   (d) moving the pair of gripping members away from one another sufficiently to remove the compressive force from the first row of first articles;
   (e) positioning the head such that the pair of gripping members at least partially laterally surrounds a second row of first articles at the first location;
   (f) the pair of gripping members applying a compressive force parallel to the first support surface to opposed laterally surrounded surfaces of the second row of first articles;
   (g) transporting the second row of first articles from the first location to the second location in close proximity to the first row of first articles, wherein the first row of first articles and the second row of first articles are arranged thereof to form an arrangement;
   (h) moving the pair of gripping members away from one another sufficiently to remove the compressive force from the second row of first articles;
   (i) moving one gripping member of the pair of gripping members in a direction perpendicular to and away from the second support surface and moving the head in a lateral direction parallel to the second support surface such that the other one gripping member of the pair of gripping members urges the second row of first articles to move in the lateral direction toward the first row of first articles;
   (j) positioning the head such that the pair of gripping members at least partially laterally surrounds a subsequent row of first articles at the first location;
   (k) the pair of gripping members applying a compressive force parallel to the first support surface to opposed laterally surrounded surfaces of the subsequent row of first articles;
   (l) transporting the subsequent row of first articles from the first location to the second location, wherein the subsequent row is added to the arrangement; and
   (m) repeating steps (i)-(l) until a complete article array is formed including the predetermined number of rows of articles.

2. The method of claim 1, wherein the second location is a container having an open top for receiving the article array.

3. The method of claim 1, wherein the head usable for building the article array from rows of first articles, each first article having a first height, a first width, and a first length, is also usable, without requiring a change-out of or modification of components of the head, for building an article array from rows of second articles, with each second article having a second height, a second width, and a second length, wherein at least one of the second height, the second width, and the second length of the second articles being different from the first height, the first width, and the first length of the first articles.

4. A method of building a pallet comprised of article arrays, each article array having a plurality of article rows comprised of first articles extending in an x-direction and a y-direction within a rectangular area footprint, the method comprising:
   (a) inputting parameters including a height dimension, a width dimension and a length dimension of a first article, a dimension of the rectangular areal footprint in the x-direction, a dimension of the rectangular areal footprint in the y-direction, a dimension of a width of article rows to be provided from an article row source, a type of arrangement to be used between adjacent article rows for building the first article arrays, a direction and length dimension of the article rows;
   (b) in response to the parameters being input, a controller controls a number of articles contained in a first row of first articles, and each subsequent row of first articles, at a first location having a horizontal first support surface for supporting each row of first articles;
   (c) positioning a head having a pair of opposed substantially planar gripping members such that the pair of gripping members at least partially laterally surrounds the first row of first articles at the first location;
   (d) the pair of gripping members applying a compressive force parallel to the first support surface to opposed laterally surrounded surfaces of the first row of first articles;
   (e) transporting the first row of first articles from the first location to a second location, the second location having a horizontal second support surface for supporting the first row of first articles and each subsequent row of first articles, the first row of first articles positioned in the inputted direction;
   (f) moving the pair of gripping members away from one another sufficiently to remove the compressive force from the first row of first articles;

(g) positioning the head such that the pair of gripping members at least partially laterally surrounds a second row of first articles at the first location;
(h) the pair of gripping members applying a compressive force parallel to the first support surface to opposed laterally surrounded surfaces of the second row of first articles;
(i) transporting the second row of first articles from the first location to the second location in close proximity to the first row of first articles, wherein the first row of first articles and the second row of first articles are arranged thereof to form an arrangement;
(j) moving the pair of gripping members away from one another sufficiently to remove the compressive force from the second row of first articles;
(k) moving one gripping member of the pair of gripping members in a direction perpendicular to and away from the second support surface and moving the head in a lateral direction parallel to the second support surface such that the other one gripping member of the pair of gripping members urges the second row of first articles to move in the lateral direction toward the first row of first articles;
(l) positioning the head such that the pair of gripping members at least partially laterally surrounds a third row of first articles at the first location;
(m) the pair of gripping members applying a compressive force parallel to the first support surface to opposed laterally surrounded surfaces of the third row of first articles;
(n) transporting the third row of first articles from the first location to the second location in close proximity to the first complete article array;
(o) moving the pair of gripping members away from one another sufficiently to remove the compressive force from the third row of first articles;
(p) positioning the head such that the pair of gripping members at least partially laterally surrounds a subsequent row of first articles at the first location;
(q) the pair of gripping members applying a compressive force parallel to the first support surface to opposed laterally surrounded surfaces of the fourth subsequent row of first articles;
(r) transporting the subsequent row of first articles from the first location to the second location, wherein the subsequent row is added to the arrangement; and
(s) repeating steps (p)-(r) until a complete article array is formed.

5. The method of claim 4, prior to step (e), further comprising the steps: positioning a pallet on the horizontal first support surface; and placing a slip sheet and a tray on the pallet.

6. The method of claim 4, further comprising the step of placing a top frame on a second article array.

7. The method of claim 4, wherein in step (b), the controller controls the number of articles contained in the first row of first articles, and each subsequent row of first articles, and at least one of the first location having the horizontal first support surface for supporting each row of first articles.

8. The method of claim 4, further comprising second articles having a third support surface for supporting each row of second articles, wherein rows of second articles are usable to form a second article array.

9. The method of claim 8, wherein each first article having a first height, a first width, and a first length, and each second article having a second height, a second width, and a second length, wherein at least one of the second height, the second width, and the second length of the second articles being different from the first height, the first width, and the first length of the first articles.

10. The method of claim 8, wherein each first article having a first height, a first width, and a first length, and each second article having a second height, a second width, and a second length, wherein each of the second height, the second width, and the second length of the second articles being generally the same as the first height, the first width, and the first length of the first articles.

11. The method of claim 9, wherein positioning the head such that the pair of gripping members at least partially laterally surrounds a row of first articles or a row of second articles is achieved without requiring a change-out of or modification of components of the head.

\* \* \* \* \*